United States Patent
Costantini

(10) Patent No.: US 9,749,077 B2
(45) Date of Patent: Aug. 29, 2017

(54) CONTROLLING OPTICAL SIGNAL POWER LEVELLING IN AN OPTICAL COMMUNICATION NETWORK

(71) Applicant: Telefonaktiebolaget L M Ericsson (publ), Stockholm (SE)

(72) Inventor: Matteo Costantini, Genoa (IT)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 60 days.

(21) Appl. No.: 14/771,638

(22) PCT Filed: Mar. 12, 2013

(86) PCT No.: PCT/EP2013/054991
§ 371 (c)(1),
(2) Date: Aug. 31, 2015

(87) PCT Pub. No.: WO2014/139557
PCT Pub. Date: Sep. 18, 2014

(65) Prior Publication Data
US 2016/0028503 A1    Jan. 28, 2016

(51) Int. Cl.
*H04B 10/00* (2013.01)
*H04J 14/02* (2006.01)
(Continued)

(52) U.S. Cl.
CPC .... *H04J 14/0221* (2013.01); *H04B 10/07955* (2013.01); *H04J 14/021* (2013.01);
(Continued)

(58) Field of Classification Search
CPC ............ H04B 10/07955; H04B 10/293; H04B 10/2931; H04B 10/296; H04J 14/0267
See application file for complete search history.

(56) References Cited

U.S. PATENT DOCUMENTS

| 8,135,280 B2* | 3/2012 | Zong ............... H04B 10/07955 398/34 |
| 2003/0161630 A1* | 8/2003 | Jayaram ............... H04B 10/077 398/9 |

(Continued)

FOREIGN PATENT DOCUMENTS

EP    1 076 434 A2    2/2001

OTHER PUBLICATIONS

International Search Report for International application No. PCT/EP2013/054991, Feb. 17, 2014.

(Continued)

*Primary Examiner* — Daniel Dobson
(74) *Attorney, Agent, or Firm* — Baker Botts, LLP

(57) ABSTRACT

A method (10) of controlling optical signal power levelling in an optical communication network node configured to apply an optical attenuation, $\alpha$, to a pass-through optical signal. The method comprises: a. performing the following steps i. to iii. until an attenuation variation value, $\Delta\alpha$, is greater than a preselected attenuation variation threshold value (18), $\Delta\alpha_{TH}$: i. measuring (12) an optical signal power of an optical signal; ii. calculating (14) a difference, $\Delta P$, between the measured optical signal power and a target optical signal power; iii. calculating (16) a value for the attenuation variation, $\Delta\alpha$, to be applied to the optical attenuation taking account of $\Delta P$; b. obtaining (20) a current value of the optical attenuation, $\alpha_n$, and obtaining (22) a new optical attenuation value, $\alpha_{n+1}$, in dependence on the current value of the optical attenuation, a current value of the attenuation variation, $\Delta\alpha_n$, and at least an earlier value of the attenuation variation, $\Delta_{\alpha n-1}$; and c. generating (24) a control signal arranged to configure the node to apply the new optical attenuation value, $\alpha_{n+1}$.

20 Claims, 18 Drawing Sheets

(51) Int. Cl.
*H04B 10/079* (2013.01)
*H04J 14/00* (2006.01)

(52) U.S. Cl.
CPC ...... *H04J 14/0212* (2013.01); *H04J 14/0268* (2013.01); *H04J 14/0206* (2013.01)

(56) References Cited

U.S. PATENT DOCUMENTS

| | | |
|---|---|---|
| 2007/0133992 A1 | 6/2007 | Yamamoto et al. |
| 2010/0183153 A1* | 7/2010 | Cho ................ H04L 45/122 380/277 |
| 2010/0202777 A1 | 8/2010 | Liu et al. |
| 2011/0188851 A1 | 8/2011 | Oda et al. |

OTHER PUBLICATIONS

Wavelength Layer Recovery in Transparent Optical Networks by Annalisa Morea et al. (XP-001552050), 2010.

* cited by examiner

CONTROLLING OPTICAL SIGNAL POWER LEVELLING IN AN OPTICAL COMMUNICATION NETWORK

PRIORITY

This nonprovisional application is a U.S. National Stage Filing under 35 U.S.C. §371 of International Patent Application Serial No. PCT/EP2013/054991, filed Mar. 12, 2013, and entitled "Controlling Optical Signal Power Levelling in an Optical Communication Network."

TECHNICAL FIELD

The invention relates to a method of controlling optical signal power levelling in an optical communication network node configured to apply an optical attenuation to a pass-through optical signal. The invention further relates to a method of controlling optical signal power levelling in an optical communication network path comprising a plurality of optical communication network nodes configured to apply an optical attenuation to a pass-through optical signal. The invention further relates to an optical communication network node. The invention further relates to a method of configuring a path across an optical communication network. The invention further relates to an optical communication network path message.

BACKGROUND

Optical communication network nodes, such as reconfigurable optical add/drop multiplexers, ROADM, typically perform optical signal power leveling on a per signal basis in order to maintain the power level of each optical signal within a preset range. Each node comprises an optical channel monitor, OCM, arranged to measure the optical signal power of each signal, and an optical attenuator arranged to apply a respective attenuation to each optical signal; in a ROADM the attenuation is typically applied by a wavelength selective switch, WSS, used to switch the optical signal with a per-wavelength granularity.

There is a given accuracy in the OCM optical signal power reading, that is not zero, (and in the WSS setting as well). This error in the optical signal power measurement of a signal can cause an adjustment of the WSS attenuation when the optical signal power is actually stable; the node interprets the reading error as a real difference between the actual optical signal power and a target optical signal power, and adjusts the attenuation accordingly. With an optical signal having a stable optical signal power what happens is that the reading error from the OCM is considered to be a "real" power error to be followed, which results in an attenuation variation being applied to the WSS, creating a real offset with respect to a target power of the optical signal. The resulting change in the optical signal power, delta power, caused by the OCM measurement error, is negligible at the output of an individual node. But where there is a chain of tens of nodes the delta power is propagated to each of the nodes in the chain, with each node adding its own delta power, and since all the nodes will react independently to compensate the "cumulated" delta power oscillations in the optical signal power of each optical signal develop, which at the end of the chain can be as high as several dB, depending on the number of nodes. In a long chain of nodes this mechanism can create power oscillations, at an optical signal level, while the total power is not affected.

U.S. Pat. No. 8,135,280 discloses power stability control in wavelength division multiplexed, WDM, networks when an optical signal power needs to be adjusted and an analogous issue of power oscillation is present due to the independent response of all the nodes in a chain. However, this only solves the issue of power oscillations caused by add/drop of channels and does not prevent power oscillations occurring in a steady state condition of a network.

SUMMARY

It is an object to provide an improved method of controlling optical signal power levelling in an optical communication network node configured to apply an optical attenuation to a pass-through optical signal. It is a further object to provide an improved method of controlling optical signal power levelling in an optical communication network path comprising a plurality of optical communication network nodes configured to apply an optical attenuation to a pass-through optical signal. It is a further object to provide an improved optical communication network node. It is a further object to provide an improved method of configuring a path across an optical communication network. It is a further object to provide an improved optical communication network path message.

A first aspect of the invention provides a method of controlling optical signal power levelling in an optical communication network node configured to apply an optical attenuation, $\alpha$, to a pass-through optical signal. The method comprises step a. of performing steps i. to iii. until an attenuation variation, $\Delta\alpha$, is greater than a preselected attenuation variation threshold value, $\Delta\alpha_{TH}$. Step i. comprises measuring an optical signal power of an optical signal. Step ii. comprises calculating a difference, $\Delta P$, between the measured optical signal power and a target optical signal power. Step iii. comprises calculating a value for the attenuation variation, $\Delta\alpha_n$, to be applied to the optical attenuation taking account of $\Delta P$. The method further comprises step b. of obtaining a current value of the optical attenuation, $\alpha_n$, and obtaining a new optical attenuation value, $\alpha_{n+1}$, in dependence on the current value of the optical attenuation, a current attenuation variation value, $\Delta\alpha_n$, and at least an earlier attenuation variation value, $\Delta\alpha_{n-1}$. The method further comprises step c. of generating a control signal arranged to configure the node to apply the new optical attenuation value, $\alpha_{n+1}$.

The method may avoid applying an attenuation variation, and thus an optical signal power variation, when $\Delta P$ is noise and it is therefore it is not necessary to apply a variation. This may reduce the occurrence of optical signal power oscillations in a pass-through optical signal transmitted across the node. The reduced occurrence of optical signal power oscillations may be achieved without requiring any real time information to be exchanged by the node with other nodes, whether adjacent or far. The method may enable a reduction in a power margin required to accommodate power variations in the pass-through optical signal, increasing the available power for the optical signal. The method may be implemented in existing nodes without requiring any additional hardware.

In an embodiment, step a. comprises performing steps i. to iii. and cumulatively summing each calculated value of the attenuation variation, $\Delta\alpha_n$, until a current value of the cumulated sum, $\Delta\alpha(sum)_n$, is greater than the preselected attenuation variation threshold value, $\Delta\alpha_{TH}$. Step a. further comprises storing each value of the cumulated sum. In step b. the new optical attenuation value, $\alpha_{n+1}$, is obtained in dependence on the current value of the cumulated sum, $\Delta\alpha(\text{sum})_n$, and at least an earlier stored value of the cumulated sum, $\Delta\alpha(\text{sum})_{n-1}$.

Cumulatively summing the calculated values of the attenuation variation, $\Delta\alpha_n$, allows averaging of the attenuation variation values, which may remove noise within the attenuation variation values. This may improve the avoidance of applying an unnecessary attenuation variation and may reduce the occurrence of optical signal power variations. In an embodiment, in step b., the new optical attenuation value, $\alpha_{n+1}$, is obtained if there is at least one earlier stored cumulated sum value, $\Delta\alpha(\text{sum})_{n-1}$, which is greater than the threshold value, $\Delta\alpha_{TH}$. The new optical attenuation value, $\alpha_{n+1}$, is obtained by summing the current value of the optical attenuation, $\alpha_n$, with the current value of the cumulated sum, $\Delta\alpha(\text{sum})_n$. If there is not at least one earlier stored cumulated sum value which is greater than the threshold value, the method comprises clearing the cumulated sum and recommencing at step a. Obtaining a new optical attenuation value, $\alpha_{n+1}$, only if there is at least one earlier stored cumulated sum value, $\Delta\alpha(\text{sum})_{-1}$, which is greater than the threshold value, $\Delta\alpha_{TH}$, may enable the method to allow time for a preceding node to correct a problem causing the difference, $\Delta P$, between the measured optical signal power and the target optical signal power. This may also ensure that a sufficient time period is considered to avoid erroneous changes to the optical attenuation, and thus the optical signal power, being applied in response to optical signal power noise, which may reduce the occurrence of optical signal power oscillations on the optical signal.

In an embodiment, in step a.iii, the value for the attenuation variation, $\Delta\alpha_n$, is calculated as $\Delta\alpha_n=\Delta P*K$, where K is a preselected first smoothing factor. Applying a first smoothing factor reduces the size of the optical attenuation variation that is applied, which may reduce the speed at which the power difference, $\Delta P$, is corrected. Therefore if the optical signal power difference, $\Delta P$, is in fact noise applying only a small optical attenuation variation may prevent optical signal power oscillations occurring.

In an embodiment, in step b., the new optical attenuation value, $\alpha_{n+1}$, is obtained if there are two consecutive stored cumulated sum values, $\Delta\alpha(\text{sum})_n$ and $\Delta\alpha(\text{sum})_{n-1}$, which are each greater than the threshold value, $\Delta\alpha_{TH}$. This may ensure that the method only implements an optical attenuation variation in response to persistent optical signal power differences and not in response to optical signal power noise, which may reduce the occurrence of optical signal power oscillations on the optical signal.

In an embodiment, in step a., each value of the cumulated sum, $\Delta\alpha(\text{sum})_n$, is stored as a sample in a register configured to store N samples. N is proportional to the inverse of the first smoothing factor, K.

Storing each value of the cumulated sum, $\Delta\alpha(\text{sum})_n$, as a sample in a register configured to store N samples, where N is proportional to $1/K$, enables the method to check that there are two consecutive stored cumulated sum values which are each greater than the threshold value, $\Delta\alpha_{TH}$, by simply checking whether two of the values stored in the register are greater than the threshold value.

In an embodiment, N is at least $(1/K)+1$. This may enable the method to compensate for the minimum $\Delta P$ that is expected to occur at the node.

In an embodiment, the first smoothing factor has a value of less than 1. In an embodiment, the first smoothing factor has a value in the range 0.05 to 0.5. This may ensure that an optimally sized optical attenuation variation is applied, which may prevent an undershoot or overshoot of the target optical power.

In an embodiment, in step b. the method comprises multiplying the current value of the cumulated sum, $\Delta\alpha(\text{sum})_n$, with a second smoothing factor before summing with the current value of the optical attenuation, $\alpha_n$. The second smoothing factor has a value of less than 1.

Applying a second smoothing factor may enable the attenuation variation to be applied more slowly. This may further reduce the speed at which the power difference, $\Delta P$, is corrected, so that if the power difference is in fact noise the applied optical attenuation variation will have a negligible impact, and the occurrence of optical signal power oscillations may be reduced.

In an embodiment, the second smoothing factor has a value in the range 0.05 to 0.5. This may ensure that an optimally sized optical attenuation variation is applied and the occurrence of optical signal power oscillations is reduced.

In an embodiment, the new optical attenuation value, $\alpha_{n+1}$, is obtained if there are at least M stored cumulated sum values, $\Delta\alpha(\text{sum})_n$, which are each greater than the threshold value, $\Delta\alpha_{TH}$. M is a positive integer calculated as a function of a number of optical communication network nodes configured to apply an optical attenuation to a pass-through optical signal preceding the said optical communication network node in a path of the optical signal. As the number of nodes in a path increases so the occurrence of noise on the optical signal increases. Obtaining the new optical attenuation value in dependence on a number of stored cumulated sum values which depends on the number of nodes may reduce the likelihood of the attenuation variation being applied in response to a power difference, $\Delta P$, which is in fact noise. This may reduce the occurrence of optical signal power oscillations.

In an embodiment, M is a positive integer calculated as a monotonically increasing function of the said number of optical communication network nodes.

In an embodiment, M is the square root of the said number of optical communication network nodes.

In an embodiment, M is a linear function of the said number of optical communication network nodes. In an embodiment, M is the said number of optical communication network nodes. In an embodiment, M is the said number of optical communication network nodes multiplied by a preselected constant. In an embodiment, N depends on K and M. In an embodiment, N is $(1/K)*M+1$ This may enable the method to check that there are M consecutive stored cumulated sum values which are greater than the threshold value, $\Delta\alpha_{TH}$, by simply checking whether there are M values stored in the register are each greater than the threshold value. This may enable the method to compensate for the minimum $\Delta P$ that is expected to occur at the node.

In an embodiment, step c. further comprises clearing the cumulated sum.

In an embodiment, the optical communication network node is further configured to apply a further optical attenuation, $\alpha(\text{add})$, to an add optical signal. The method comprises, if the optical signal is an add optical signal, performing the following steps d. and e in place of steps b. and c. Step d. comprises obtaining a current value of the further optical attenuation, $\alpha(\text{add})_n$, and summing said value, $\alpha(\text{add})_n$, with the current attenuation variation value, $\Delta\alpha_n$, to form a new further optical attenuation value, $\alpha(\text{add})_{+1}$. Step e. comprises generating a control signal arranged to configure the node to apply the new further optical attenuation value, $\alpha(\mathrm{add})_{n+1}$.

In an embodiment, where step a. comprises performing steps i. to iii. and cumulatively summing each calculated value of the attenuation variation, $\Delta\alpha_n$, until a current value of the cumulated sum, $\Delta\alpha(\mathrm{sum})_n$, is greater than the preselected attenuation variation threshold value, $\Delta\alpha_{TH}$, step d. comprises summing the current value of the further optical attenuation, $\alpha(\mathrm{add})_n$, with the current value of the cumulated sum, $\Delta\alpha(\mathrm{sum})_n$, to form the new further optical attenuation value, $\alpha(\mathrm{add})_{n+1}$.

The method may control optical signal power levelling of both pass-through optical signals and optical signals added at the node. In an embodiment, the optical communication network node comprises an optical channel monitor and step i. comprises measuring the optical signal power of the optical signal with the optical channel monitor.

In an embodiment, the optical communication network node comprises a wavelength selective switch configured to apply the optical attenuation, $\alpha$, to the pass-through optical signal and in step c. the control signal is arranged to configure the wavelength selective switch to apply the new optical attenuation value, $\alpha_{n+1}$.

In an embodiment, the preselected attenuation variation threshold value, $\Delta\alpha_{TH}$, is a dead-zone threshold setting of the wavelength selective switch.

In an embodiment, the optical communication network node is a wavelength division multiplexed optical communication network node configured to apply a respective optical attenuation, $\alpha$, to each of a plurality of pass-through optical signals, each optical signal having a different wavelength. The method is separately applied to each pass-through optical signal.

In an embodiment, the optical communication network node is a dense wavelength division multiplexed optical communication network node.

In an embodiment, the optical communication network node is a reconfigurable optical add/drop multiplexer.

A second aspect of the invention provides a method of controlling optical signal power levelling in an optical communication network path comprising a plurality of optical communication network nodes. Each node is configured to apply a respective optical attenuation, $\alpha$, to a pass-through optical signal propagating along the path. The method comprising configuring each optical communication network node to perform step a. of performing steps i. to iii. until an attenuation variation, $\Delta\alpha$, is greater than a preselected attenuation variation threshold value, $\Delta\alpha_{TH}$. Step i. comprises measuring an optical signal power of an optical signal. Step ii. comprises calculating a difference, $\Delta P$, between the measured optical signal power and a target optical signal power. Step iii. comprises calculating a value for the attenuation variation, $\Delta\alpha_n$, to be applied to the optical attenuation taking account of $\Delta P$. The method further comprises configuring each optical communication network node to perform step b. of obtaining a current value of the optical attenuation, $\alpha_n$, and obtaining a new optical attenuation value, $\alpha_{n+1}$, in dependence on the current value of the optical attenuation, a current attenuation variation value, $\Delta\alpha(\mathrm{sum})_n$, and at least an earlier attenuation variation value, $\Delta\alpha_{n-1}$. The method further comprises configuring each optical communication network node to perform step c. of generating a control signal arranged to configure the node to apply the new optical attenuation value, $\alpha_{n+1}$.

Configuring the nodes in this way may avoid applying an attenuation variation, and thus an optical signal power variation, when $\Delta P$ is noise and it is therefore not necessary to apply a variation. This may reduce the occurrence of optical signal power oscillations in a pass-through optical signal transmitted across the path. The reduction in the occurrence of optical signal power oscillations may be achieved without requiring any real time information to be exchanged between nodes of the path, whether adjacent or far. Configuring the nodes in this way may increase the number of nodes in a path and may increase the distance that an optical signal can be transmitted without optical signal power oscillations occurring. The method may be used to configure existing nodes without requiring any additional hardware.

In an embodiment, each optical communication network node is configured in step a. to perform steps i. to iii. and cumulatively sum each calculated value of the attenuation variation, $\Delta\alpha_n$, until a current value of the cumulated sum, $\Delta\alpha(\mathrm{sum})_n$, is greater than the preselected attenuation variation threshold value, $\Delta\alpha_{TH}$. Each optical communication network node is further configured to, in step a., store each value of the cumulated sum. Each optical communication network node is configured to, in step b., obtain the new optical attenuation value, $\alpha_{n+1}$, in dependence on the current value of the cumulated sum, $\Delta\alpha(\mathrm{sum})_n$, and at least an earlier stored cumulated sum value, $\Delta\alpha(\mathrm{sum})_{n-1}$.

Configuring each node to cumulatively sum the calculated values of the attenuation variation, $\Delta\alpha_n$, allows averaging of the attenuation variation values, which may remove noise within the attenuation variation values. This may improve the avoidance of applying an unnecessary attenuation variation and may reduce the occurrence of optical signal power variations. In an embodiment, in step b., the new optical attenuation value, $\alpha_{n+1}$, is obtained if there is at least one earlier stored cumulated sum value, $\Delta\alpha(\mathrm{sum})_{n-1}$, which is greater than the threshold value, $\Delta\alpha_{TH}$. The new optical attenuation value, $\alpha_{n+1}$, is obtained by summing the current value of the optical attenuation, $\alpha_n$, with the current value of the cumulated sum, $\Delta\alpha(\mathrm{sum})_n$. Each optical communication network node is further configured to, if there is not at least one earlier stored cumulated sum value which is greater than the threshold value, clear the cumulated sum and recommence at step a. Obtaining a new optical attenuation value, $\alpha_{n+1}$, only if there is at least one earlier stored cumulated sum value, $\Delta\alpha(\mathrm{sum})_{n-1}$, which is greater than the threshold value, $\Delta\alpha_{TH}$, may enable each node to allow time for a preceding node in the path to correct a problem causing the difference, $\Delta P$, between the measured optical signal power and the target optical signal power. This may also ensure that each node allows a sufficient time period to be considered to avoid erroneous changes to the optical attenuation, and thus the optical signal power, being applied in response to optical signal power noise, which may reduce the occurrence of optical signal power oscillations on the optical signal.

In an embodiment, in step a.iii, the value for the attenuation variation, $\Delta\alpha_n$, is calculated as $\Delta\alpha_n = \Delta P * K$, where K is a preselected first smoothing factor. Applying a first smoothing factor reduces the size of the optical attenuation variation that is applied, which may reduce the speed at which the power difference, $\Delta P$, is corrected. Therefore if the optical signal power difference, $\Delta P$, is in fact noise applying only a small optical attenuation variation may prevent optical signal power oscillations occurring.

In an embodiment, in step b., the new optical attenuation value, $\alpha_{n+1}$, is obtained if there are two consecutive stored cumulated sum values, $\Delta\alpha(\mathrm{sum})_n$ and $\Delta\alpha(\mathrm{sum})_{n-1}$, which are each greater than the threshold value, $\Delta\alpha_{TH}$. This may ensure that each node only implements an optical attenuation variation in response to persistent optical signal power differences and not in response to optical signal power noise, which may reduce the occurrence of optical signal power oscillations on the optical signal.

In an embodiment, in step a., each value of the cumulated sum, $\Delta\alpha(sum)_n$, is stored as a sample in a register configured to store N samples. N is proportional to the inverse of the first smoothing factor, K.

Storing each value of the cumulated sum, $\Delta\alpha(sum)$, as a sample in a register configured to store N samples, where N is proportional to 1/K, enables the method to check that there are two consecutive stored cumulated sum values which are each greater than the threshold value, $\Delta\alpha_{TH}$, by simply checking whether two of the values stored in the register are greater than the threshold value In an embodiment, N is at least (1/K)+1. This may enable each node to compensate for the minimum $\Delta P$ that is expected to occur at it.

In an embodiment, the first smoothing factor has a value of less than 1. In an embodiment, the first smoothing factor has a value in the range 0.05 to 0.5. This may ensure that an optimally sized optical attenuation variation is applied, which may prevent an undershoot or overshoot of the target optical power. In an embodiment, in step b. the current value of the cumulated sum, $\Delta\alpha(sum)_n$, is multiplied with a second smoothing factor before summing with the current value of the optical attenuation, $\alpha_n$. The second smoothing factor has a value of less than 1.

Applying a second smoothing factor may enable the attenuation variation to be applied more slowly. This may further reduce the speed at which the power difference, $\Delta P$, is corrected, so that if the power difference is in fact noise the applied optical attenuation variation will have a negligible impact, and the occurrence of optical signal power oscillations may be reduced.

In an embodiment, the second smoothing factor has a value in the range 0.05 to 0.5. This may ensure that an optimally sized optical attenuation variation is applied.

In an embodiment, each optical communication network node is configured to obtain the new optical attenuation value, $\alpha_{n+1}$, if there are at least M stored cumulated sum values, $\Delta\alpha(sum)$, which are each greater than the threshold value, $\Delta\alpha_{TH}$. M is a positive integer calculated as a function of a number of optical communication network nodes configured to apply an optical attenuation to a pass-through optical signal preceding the said optical communication network node in a path of the optical signal. As the number of nodes in a path increases so the occurrence of noise on the optical signal increases. Obtaining the new optical attenuation value in dependence on a number of stored values of the cumulated sum which depends on the number of nodes may reduce the likelihood of the attenuation variation being applied in response to a power difference, $\Delta P$, which is in fact noise. This may reduce the occurrence of optical signal power oscillations.

In an embodiment, M is a positive integer calculated as a monotonically increasing function of the said number of optical communication network nodes.

In an embodiment, M is the square root of the said number of optical communication network nodes.

In an embodiment, M is a linear function of the said number of optical communication network nodes. In an embodiment, M is the said number of optical communication network nodes. In an embodiment, M is the said number of optical communication network nodes multiplied by a preselected constant.

In an embodiment, N depends on K and M. In an embodiment, N is (1/K)*M+1

This may ensure that sufficient values of the cumulated sum are stored for a check to be performed that there are M consecutive stored cumulated sum values which are each greater than the threshold value, $\Delta\alpha_{TH}$. This may enable the method to compensate for the minimum $\Delta P$ that is expected to occur at the node.

In an embodiment, each optical communication network node is configured to, in step c., clear the cumulated sum. In an embodiment, each optical communication network node is further configured to apply a further optical attenuation, $\alpha(add)$, to an add optical. The method further comprises configuring each node to, if the optical signal is an add optical signal, perform steps d. and e in place of steps b. and c. Step d. comprises obtaining a current value of the further optical attenuation, $\alpha(add)_n$, and summing said value, $\alpha(add)_n$, with the current attenuation variation value, $\Delta\alpha_n$, to form a new further optical attenuation value, $\alpha(add)_{n+1}$. Step e. comprises generating a control signal arranged to configure the node to apply the new further optical attenuation value, $\alpha(add)_{n+1}$.

In an embodiment, where the optical communication network nodes are configured to, in step a., perform steps i. to iii. and cumulatively summing each calculated value of the attenuation variation, $\Delta\alpha_n$, until a current value of the cumulated sum, $\Delta\alpha(sum)_n$, is greater than the preselected attenuation variation threshold value, $\Delta\alpha_{TH}$, each optical communication network node is configured in step d. to sum the current value of the further optical attenuation, $\alpha(add)_n$, with the current value of the cumulated sum, $\Delta\alpha(sum)_n$, to form the new further optical attenuation value, $\alpha(add)_{n+1}$.

In an embodiment, the method comprises generating a path message arranged to configure the path and transmitting the path message to each node serially along the path. The path message comprises an indication of a number of nodes crossed by the path message and the method comprises respectively updating the indication of the number of nodes at each node.

In an embodiment, the path message is one of a strict explicit route object RSVP-TE protocol message and a loose explicit route object RSVP-TE protocol message.

In an embodiment, the indication of a number of nodes crossed by the path message is one of a node count field arranged to store the number of nodes crossed by the path message and a node list comprising an identification of each node crossed by the path message.

In an embodiment, each optical communication network node comprises an optical channel monitor and step i. comprises measuring the optical signal power of the optical signal with the optical channel monitor.

In an embodiment, each optical communication network node comprises a wavelength selective switch configured to apply the optical attenuation, $\alpha$, to the pass-through optical signal and in step c. the control signal is arranged to configure the wavelength selective switch to apply the new optical attenuation value, $\alpha_{n+1}$.

In an embodiment, the preselected attenuation variation threshold value, $\Delta\alpha_{TH}$, is a dead-zone threshold of the wavelength selective switch.

In an embodiment, each optical communication network node is a wavelength division multiplexed optical communication network node configured to apply a respective optical attenuation, $\alpha$, to each of a plurality of pass-through optical signals, each optical signal having a different wavelength. The method comprises configuring each optical communication network node to separately apply steps a. to c. to each pass-through optical signal.

In an embodiment, each optical communication network node is a dense wavelength division multiplexed optical communication network node.

In an embodiment, the optical communication network node is a reconfigurable optical add/drop multiplexer.

A third aspect of the invention provides an optical communication network node comprising an input, optical attenuation apparatus, optical signal power measurement apparatus, and a controller. The input is arranged to receive an optical signal. The optical attenuation apparatus is configured to apply an optical attenuation, $\alpha$, to a pass-through optical signal. The optical signal power measurement apparatus is configured to measure an optical signal power of the optical signal. The controller is configured to perform the following steps i. to iii. until an attenuation variation, $\Delta\alpha$, is greater than a preselected attenuation variation threshold value, $\Delta\alpha_{TH}$. Step i. comprises receiving a measured optical signal power from the optical signal power measurement apparatus. Step ii. comprises calculating a difference, $\Delta P$, between the measured optical signal power and a target optical signal power. Step iii. comprises calculating a value for the attenuation variation, $\Delta\alpha_n$, to be applied to the optical attenuation taking account of $\Delta P$. The controller is further configured to obtain a current value of the optical attenuation, $\alpha_n$, and obtain a new optical attenuation value, $\alpha_{n+1}$, in dependence on the current value of the optical attenuation, a current attenuation variation value, $\Delta\alpha(sum)_n$, and at least an earlier attenuation variation value, $\Delta\alpha_{n-1}$. The controller is further configured to generate a control signal arranged to configure the optical attenuation apparatus to apply the new optical attenuation value, $\alpha_{n+1}$.

The node may avoid applying an attenuation variation, and thus an optical signal power variation, when $\Delta P$ is noise and it is therefore not necessary to apply a variation. This may reduce the occurrence of optical signal power oscillations in a pass-through optical signal. The reduced occurrence of optical signal power oscillations may be achieved without requiring any real time information to be exchanged by the node with other nodes, whether adjacent or far. Using this node may enable an increase in the number of nodes in a path across an optical communication network and may increase the distance that an optical signal can be transmitted without optical signal power oscillations occurring. The node does not require any additional hardware to operate in this way.

In an embodiment, the controller is configured in step a. to perform steps i. to iii. and cumulatively sum each calculated value of the attenuation variation, $\Delta\alpha_n$, until a current value of the cumulated sum, $\Delta\alpha(sum)_n$, is greater than the preselected attenuation variation threshold value, $\Delta\alpha_{TH}$. The controller is further configured to, in step a., store each value of the cumulated sum. The controller is configured to, in step b., obtain the new optical attenuation value, $\alpha_{n+1}$, in dependence on the current value of the cumulated sum, $\Delta\alpha(sum)_n$, and at least an earlier stored value of the cumulated sum, $\Delta\alpha(sum)_{n-1}$.

Configuring the controller to cumulatively sum the calculated values of the attenuation variation, $\Delta\alpha_n$, allows averaging of the attenuation variation values, which may remove noise within the attenuation variation values. This may improve the avoidance of applying an unnecessary attenuation variation and may reduce the occurrence of optical signal power variations.

In an embodiment, the controller is configured to obtain the new optical attenuation value, $\alpha_{n+1}$, if there is at least one earlier stored cumulated sum value, $\Delta\alpha(sum)_{n-1}$, which is greater than the threshold value, $\Delta\alpha_{TH}$. The controller is arranged to obtain the new optical attenuation value, $\alpha_{n+1}$, by summing the current value of the optical attenuation, $\alpha_n$, with the current value of the cumulated sum, $\Delta\alpha(sum)_n$. The controller is arranged to, if there is not at least one earlier stored cumulated sum value which is greater than the threshold value, clear the cumulated sum and recommence at step a. Configuring the controller to obtain a new optical attenuation value, $\alpha_{n+1}$, only if there is at least one earlier stored cumulated sum value, $\Delta\alpha(sum)_{n-1}$, which is greater than the threshold value, $\Delta\alpha_{TH}$, may enable the node to allow time for a preceding node in a path across an optical communication network to correct a problem causing the difference, $\Delta P$, between the measured optical signal power and the target optical signal power. This may also ensure that the node allows a sufficient time period to be considered to avoid erroneous changes to the optical attenuation, and thus the optical signal power, being applied in response to optical signal power noise, which may reduce the occurrence of optical signal power oscillations on the optical signal.

In an embodiment, the controller is configured to, in step a.iii, calculate the value for the attenuation variation, $\Delta\alpha_n$, as $\Delta\alpha_n = \Delta P * K$, where K is a preselected first smoothing factor. Configuring the controller to apply a first smoothing factor reduces the size of the optical attenuation variation that is applied, which may reduce the speed at which the power difference, $\Delta P$, is corrected. Therefore if the optical signal power difference, $\Delta P$, is in fact noise the controller will cause only a small optical attenuation variation to be applied may prevent optical signal power oscillations occurring.

In an embodiment, the controller is configured to obtain a new optical attenuation value, $\alpha_{n+1}$, if there are two consecutive stored cumulated sum values, $\Delta\alpha(sum)_n$ and $\Delta\alpha(sum)_{n-1}$, which are each greater than the threshold value, $\Delta\alpha_{TH}$. This may ensure that the node only implements an optical attenuation variation in response to persistent optical signal power differences and not in response to optical signal power noise, which may reduce the occurrence of optical signal power oscillations on the optical signal.

In an embodiment, the controller is configured to store each value of the cumulated sum, $\Delta\alpha(sum)$, as a sample in a register configured to store N samples. N is proportional to the inverse of the first smoothing factor, K.

Storing each value of the cumulated sum, $\Delta\alpha(sum)$, as a sample in a register configured to store N samples, where N is proportional to 1/K, enables the controller to check that there are two consecutive stored cumulated sum values which are each greater than the threshold value, $\Delta\alpha_{TH}$, by simply checking whether two of the values stored in the register are greater than the threshold value. In an embodiment, N is at least (1/K)+1. This may enable the node to compensate for the minimum $\Delta P$ that is expected to occur at it.

In an embodiment, the first smoothing factor has a value of less than 1. In an embodiment, the first smoothing factor has a value in the range 0.05 to 0.5. This may ensure that an optimally sized optical attenuation variation is applied, which may prevent an undershoot or overshoot of the target optical power. In an embodiment, the controller is configured to multiply the current value of the cumulated sum, $\Delta\alpha(sum)_n$, with a second smoothing factor before summing with the current value of the optical attenuation, $\alpha_n$. The second smoothing factor has a value of less than 1.

Configuring the controller to apply a second smoothing factor may enable the attenuation variation to be applied more slowly. This may further reduce the speed at which the power difference, ΔP, is corrected, so that if the power difference is in fact noise the applied optical attenuation variation will have a negligible impact, and the occurrence of optical signal power oscillations may be reduced.

In an embodiment, the second smoothing factor has a value in the range 0.05 to 0.5. This may ensure that an optimally sized optical attenuation variation is applied and the occurrence of optical signal power oscillations is reduced.

In an embodiment, the controller is configured to obtain the new optical attenuation value, $\alpha_{n+1}$, if there are at least M stored cumulated sum values, $\Delta\alpha(\text{sum})$, which are each greater than the threshold value, $\Delta\alpha_{TH}$. M is a positive integer calculated as a function of a number of optical communication network nodes configured to apply an optical attenuation to a pass-through optical signal preceding the said optical communication network node in a path of the optical signal. As the number of nodes in a path increases so the occurrence of noise on the optical signal increases. Configuring the controller to obtain the new optical attenuation value in dependence on a number of stored values of the cumulated sum which depends on the number of nodes may reduce the likelihood of the attenuation variation being applied in response to a power difference, ΔP, which is in fact noise. This may reduce the occurrence of optical signal power oscillations.

In an embodiment, M is a positive integer calculated as a monotonically increasing function of the said number of optical communication network nodes.

In an embodiment, M is the square root of the said number of optical communication network nodes.

In an embodiment, M is a linear function of the said number of optical communication network nodes. In an embodiment, M is the said number of optical communication network nodes. In an embodiment, M is the said number of optical communication network nodes multiplied by a preselected constant. In an embodiment, N depends on K and M. In an embodiment, N is (1/K)*M+1

This may ensure that sufficient values of the cumulated sum are stored for the controller to check that there are M consecutive stored cumulated sum values which are greater than the threshold value, $\Delta\alpha_{TH}$. This may enable the node to compensate for the minimum ΔP that is expected to occur.

In an embodiment, the controller is configured to, in step c., clear the cumulated sum.

In an embodiment, the optical communication network node is further configured to apply a further optical attenuation, α(add), to an add optical signal. The controller is configured to, if the optical signal is an add optical signal, perform steps d. and e in place of steps b. and c. Step d. comprises obtaining a current value of the further optical attenuation, $\alpha(\text{add})_n$, and summing said value, $\alpha(\text{add})_n$, with the current attenuation variation value, $\Delta\alpha_n$, to form a new further optical attenuation value, $\alpha(\text{add})_{n+1}$. Step e. comprises generating a control signal arranged to configure the node to apply the new further optical attenuation value, $\alpha(\text{add})_{n+1}$.

In an embodiment, where the controller is configured to, in step a., perform steps i. to iii. and cumulatively sum each calculated value of the attenuation variation, $\Delta\alpha_n$, until a current value of the cumulated sum, $\Delta\alpha(\text{sum})_n$, is greater than the preselected attenuation variation threshold value, $\Delta\alpha_{TH}$, the controller is configured in step d. to sum the current value of the further optical attenuation, $\alpha(\text{add})_n$, with the current value of the cumulated sum, $\Delta\alpha(\text{sum})_n$, to form the new further optical attenuation value, $\alpha(\text{add})_{n+1}$.

In an embodiment, the optical signal power measurement apparatus is an optical channel monitor and step i. comprises measuring the optical signal power of the optical signal with the optical channel monitor.

In an embodiment, the optical attenuation apparatus is a wavelength selective switch configured to apply the optical attenuation, α, to the pass-through optical signal and the controller is arranged to generate a control signal arranged to configure the wavelength selective switch to apply the new optical attenuation value, $\alpha_{n+1}$.

In an embodiment, the preselected attenuation variation threshold value, $\Delta\alpha_{TH}$, is a dead-zone threshold of the wavelength selective switch.

In an embodiment, the optical communication network node is a wavelength division multiplexed optical communication network node. The optical signal power measurement apparatus is configured to measure a respective optical signal power of each of a plurality of optical signals, each optical signal having a different wavelength. The optical attenuation apparatus is configured to apply a respective optical attenuation, α, to each of a plurality of pass-through optical signals, each optical signal having a different wavelength. The controller is configured to, for each optical signal, perform steps i. to iii. and cumulatively sum each calculated value of the attenuation variation, $\Delta\alpha_n$, until the cumulated sum, $\Delta\alpha(\text{sum})_n$, is greater than the preselected attenuation variation threshold value, $\Delta\alpha_{TH}$. The controller is configured to for each pass-through optical signal, if there is at least one earlier cumulated sum, $\Delta\alpha(\text{sum})_{n-1}$, which is greater than the threshold value, $\Delta\alpha_{TH}$, obtain a current value of the respective optical attenuation, $\alpha_n$, and sum it with the respective cumulated sum, $\Delta\alpha(\text{sum})_n$, to obtain a new respective optical attenuation value, $\alpha_{n+1}$. The controller is further configured to generate a control signal arranged to configure the optical attenuation apparatus to apply each respective new optical attenuation value, $\alpha_{n+1}$.

In an embodiment, the optical communication network node is a dense wavelength division multiplexed optical communication network node.

In an embodiment, the optical communication network node is a reconfigurable optical add/drop multiplexer.

A fourth aspect of the invention provides a method of configuring a path for an optical signal across an optical communication network. The method comprises generating a path message arranged to configure the path. The method comprises transmitting the path message to each node serially along the path. The path message comprises an indication of a number of nodes crossed by the path message. The method comprises, at each node, updating the indication of the number of nodes crossed by the path message.

The method may enable each node of the path to be configured in dependence on the number of nodes preceding it in the path. The method may be implemented in existing nodes without requiring any additional hardware.

In an embodiment, the path comprises a plurality of nodes of the optical communication network and the path message is arranged to configure each node in the path in dependence on the number of nodes preceding it. This may enable each node to be configured according to its position within the path for that optical signal.

In an embodiment, the optical communication network node is a wavelength division multiplexed optical communication network node.

In an embodiment, the optical communication network node is a dense wavelength division multiplexed optical communication network node.

In an embodiment, the optical communication network node is a reconfigurable optical add/drop multiplexer.

In an embodiment, the path message is one of a strict explicit route object RSVP-TE protocol message and a loose explicit route object RSVP-TE protocol message.

In an embodiment, the indication of a number of nodes crossed by the path message is one of a node count field arranged to store the number of nodes crossed by the path message and a node list comprising an identification of each node crossed by the path message.

A fifth aspect of the invention provides an optical communication network path message comprising instructions for configuring a path across an optical communication network and an indication of a number of nodes crossed by the path message.

The path message may enable each node of the path to be configured in dependence on the number of nodes preceding it in the path. The path message may be implemented to configure existing nodes without requiring any additional hardware.

In an embodiment, the path comprises a plurality of nodes of the optical communication network and the path message comprises instructions for configuring each node in the path in dependence on the number of nodes preceding it. This may enable the path message to cause each node to be configured according to its position within the path and may enable the path message to cause each node to be configured to handle optical signals according to its position within the path.

In an embodiment, the optical communication network node is a wavelength division multiplexed optical communication network node.

In an embodiment, the optical communication network node is a dense wavelength division multiplexed optical communication network node.

In an embodiment, the optical communication network node is a reconfigurable optical add/drop multiplexer.

In an embodiment, the path message is one of a strict explicit route object RSVP-TE protocol message and a loose explicit route object RSVP-TE protocol message.

In an embodiment, the indication of a number of nodes crossed by the path message is one of a node count field arranged to store the number of nodes crossed by the path message and a node list comprising an identification of each node crossed by the path message.

A sixth aspect of the invention provides a data carrier having computer readable instructions embodied therein, the computer readable instructions being for providing access to resources available on a processor and the computer readable instructions comprising instructions to cause the processor to perform any of the above steps of the method of controlling optical signal power levelling in an optical communication network node configured to apply an optical attenuation to an optical signal.

In an embodiment, the data carrier is a non-transitory data carrier.

A seventh aspect of the invention provides a data carrier having computer readable instructions embodied therein, the computer readable instructions being for providing access to resources available on a processor and the computer readable instructions comprising instructions to cause the processor to perform any of the above steps of the method of controlling optical signal power levelling in an optical communication network path comprising a plurality of optical communication network nodes each configured to apply an optical attenuation to an optical signal propagating along the path.

In an embodiment, the data carrier is a non-transitory data carrier.

An eighth aspect of the invention provides a data carrier having computer readable instructions embodied therein, the computer readable instructions being for providing access to resources available on a processor and the computer readable instructions comprising instructions to cause the processor to perform any of the above steps of the method of configuring a path across an optical communication network.

In an embodiment, the data carrier is a non-transitory data carrier.

Embodiments of the invention will now be described, by way of example only, with reference to the accompanying drawings.

DETAILED DESCRIPTION

Figure 1:
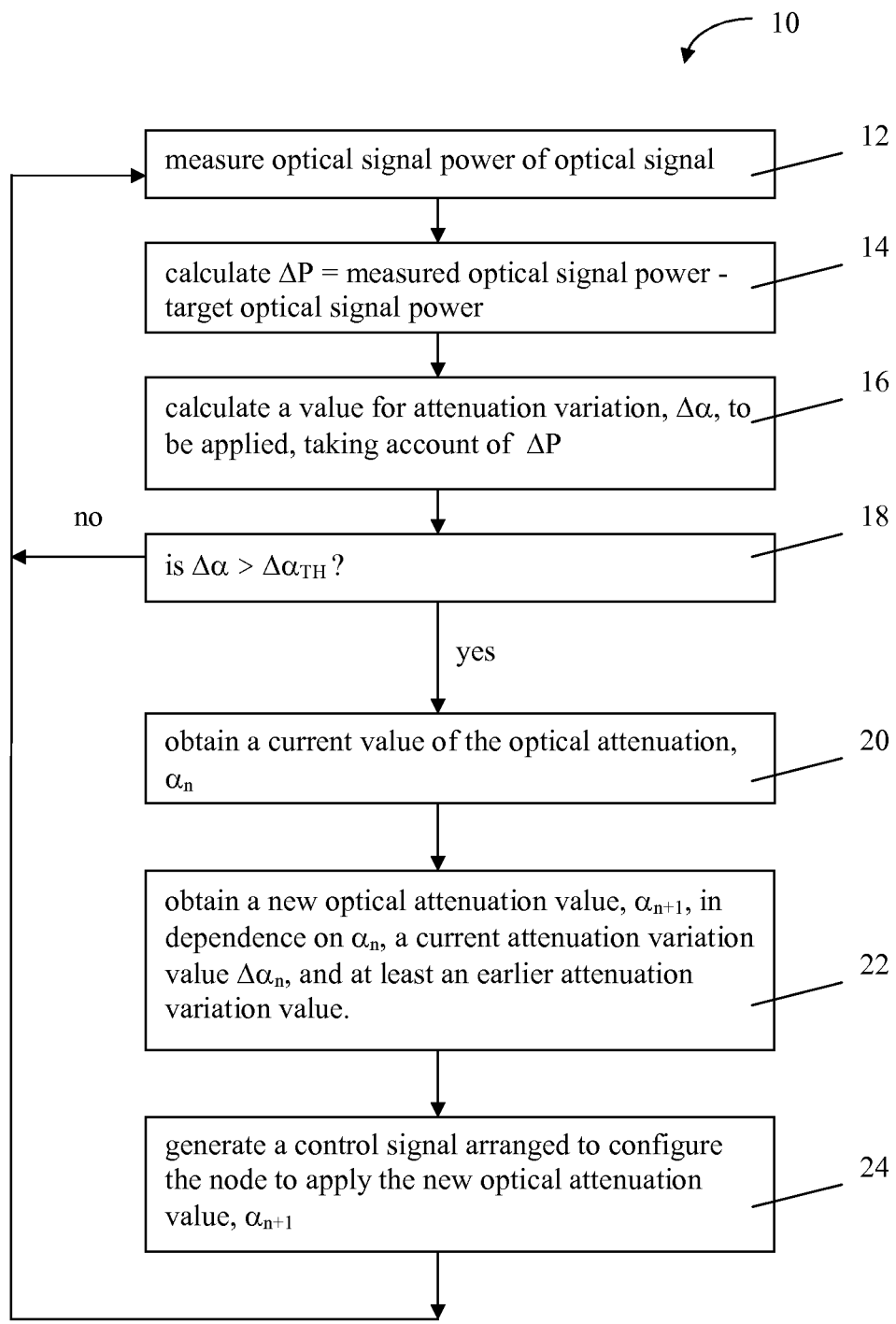
FIG. 1 shows the steps of a method according to a first embodiment of the invention of controlling optical signal power levelling in an optical communication network node configured to apply an optical attenuation to an optical signal.

Referring to FIG. 1 a first embodiment of the invention provides a method 10 of controlling optical signal power levelling in an optical communication network node. The node is configured to apply an optical attenuation, $\alpha$, to a pass-through optical signal.

The method comprises:
a. performing the following steps i. to iii. until an attenuation variation value, $\Delta\alpha$, is greater than a preselected attenuation variation threshold value 18, $\Delta\alpha_{TH}$:
   i. measuring 12 an optical signal power of an optical signal;
   ii. calculating 14 a difference, $\Delta$P, between the measured optical signal power and a target optical signal power;
   iii. calculating 16 a value for the attenuation variation, $\Delta\alpha$, to be applied to the optical attenuation taking account of $\Delta$P;
b. obtaining 20 a current value of the optical attenuation, $\alpha_n$, and obtaining 22 a new optical attenuation value, $\alpha_{n+1}$, in dependence on the current value of the optical attenuation, a current value of the attenuation variation, $\Delta\alpha_n$, and at least an earlier value of the attenuation variation, $\Delta\alpha_{n-1}$; and
c. generating 24 a control signal arranged to configure the node to apply the new optical attenuation value, $\alpha_{n+1}$.

Figure 2:
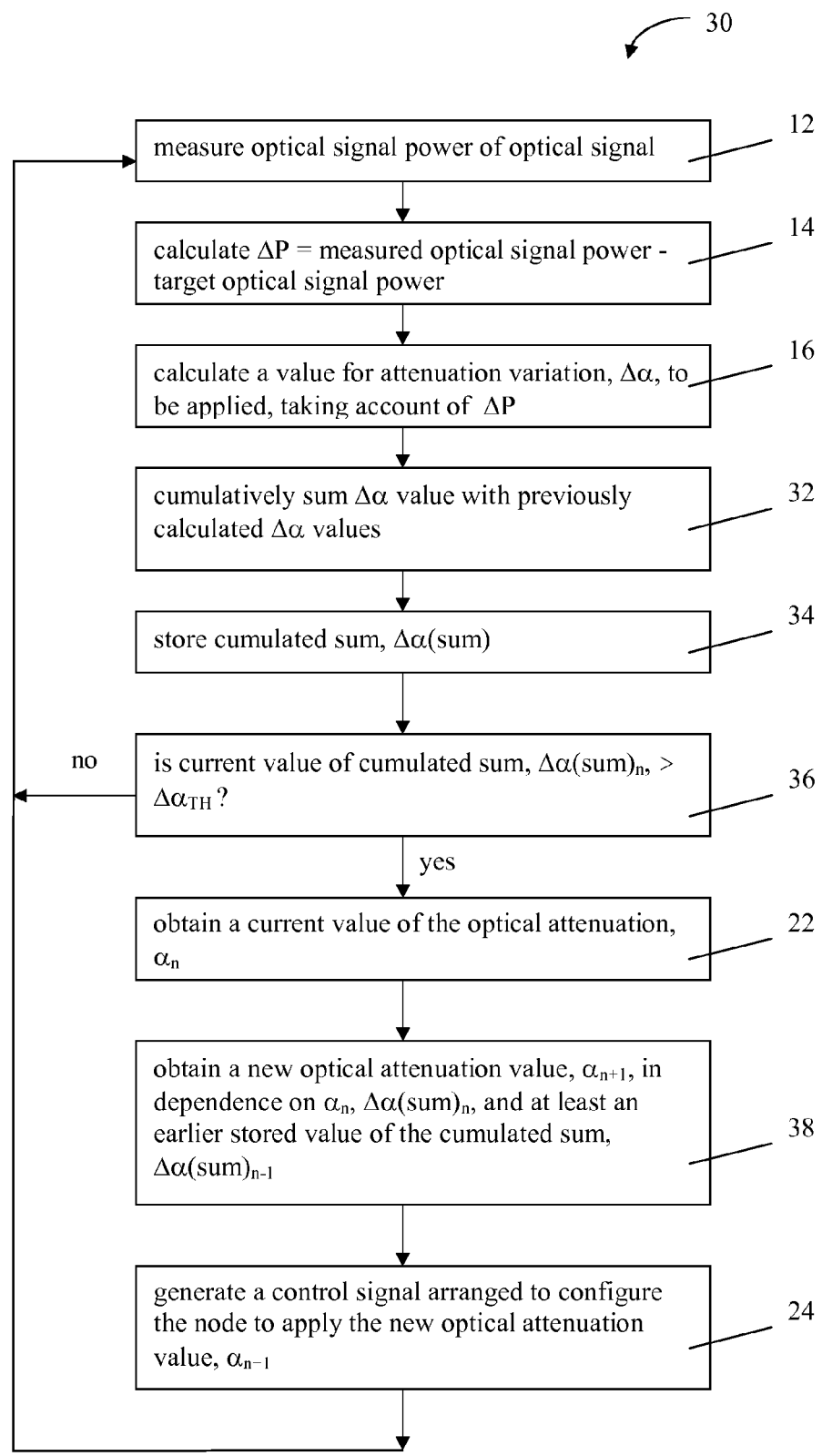
FIG. 2 shows the steps of a method according to a second embodiment of the invention of controlling optical signal power levelling in an optical communication network node configured to apply an optical attenuation to an optical signal.

Referring to FIG. 2 a second embodiment of the invention provides a method 30 of controlling optical signal power levelling in an optical communication network node. The node is configured to apply an optical attenuation, $\alpha$, to a pass-through optical signal.

The method 30 of this embodiment is similar to the method 10 of FIG. 1, with the following modifications. The same reference numbers are retained for corresponding steps.

In this embodiment, step a. comprises performing steps i. to iii. and cumulatively summing 32 each calculated value of the attenuation variation, $\Delta\alpha_n$. Step a. further comprises storing each calculated value of the cumulated sum 34. Step a. repeats until a current value of the cumulated sum, $\Delta\alpha(\text{sum})_n$, is greater than the preselected attenuation variation threshold value 36, $\Delta\alpha_{TH}$.

In step b., the new optical attenuation value, $\alpha_{n+1}$, is obtained 38 in dependence on the current value of the cumulated sum, $\Delta\alpha(\text{sum})_n$, and at least an earlier stored value of the cumulated sum, $\Delta\alpha(\text{sum})_{n-1}$.

Figure 3:
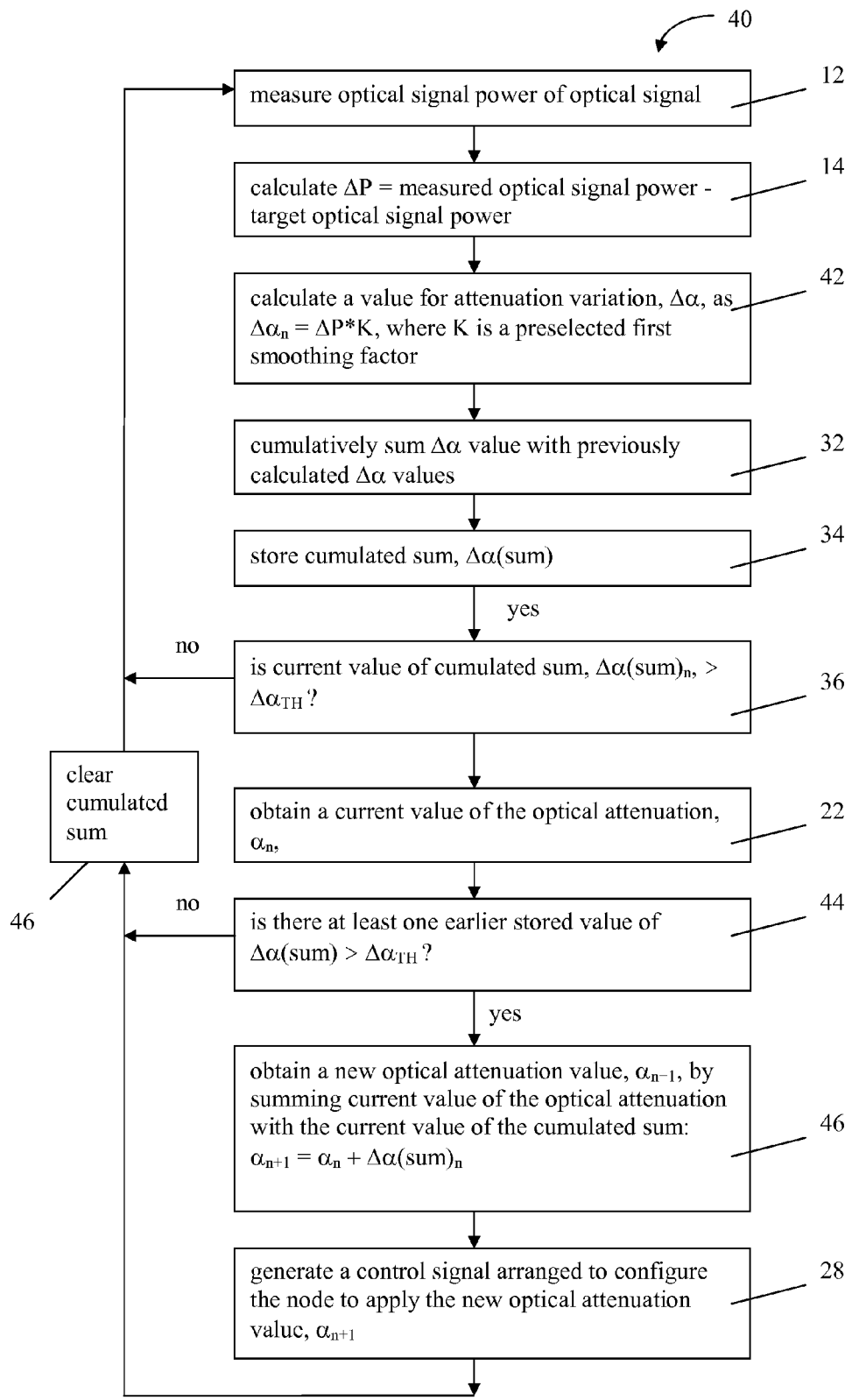
FIG. 3 shows the steps of a method according to a third embodiment of the invention of controlling optical signal power levelling in an optical communication network node configured to apply an optical attenuation to an optical signal.

Referring to FIG. 3 a third embodiment of the invention provides a method 40 of controlling optical signal power levelling in an optical communication network node. The node is configured to apply an optical attenuation, $\alpha$, to a pass-through optical signal.

The method 40 of this embodiment is similar to the method 30 of FIG. 2, with the following modifications. The same reference numbers are retained for corresponding steps.

In this embodiment, in step a.iii, the value for the attenuation variation, $\Delta\alpha_n$, is calculated 42 as $\Delta\alpha_n=\Delta P*K$, where K is a preselected first smoothing factor.

In this embodiment, in step b., the new optical attenuation value, $\alpha_{n+1}$, is obtained if 44 there is at least one earlier stored value of the cumulated sum, $\Delta\alpha(\text{sum})_{n+1}$, which is greater than the threshold value, $\Delta\alpha_{TH}$. The new optical attenuation value, $\alpha_{n+1}$, is obtained 46 by summing the current value of the optical attenuation, $\alpha_n$, with the current value of the cumulated sum, $\Delta\alpha(\text{sum})_n$. If there is not at least one earlier stored value of the cumulated sum which is greater than the threshold value, the method comprises clearing the cumulated sum 46 and recommencing at step a.

Optical signal power variations are not expected on pass-through optical signals, therefore if a $\Delta$P is detected the method initially assumes that the ΔP is noise and discards the first value of the cumulated sum which is greater than the threshold value. If there is a second occurrence of the cumulated sum being greater than the threshold value then the method assumes that the ΔP is not noise but rather is an optical signal power different which needs to be corrected.

Figure 4:
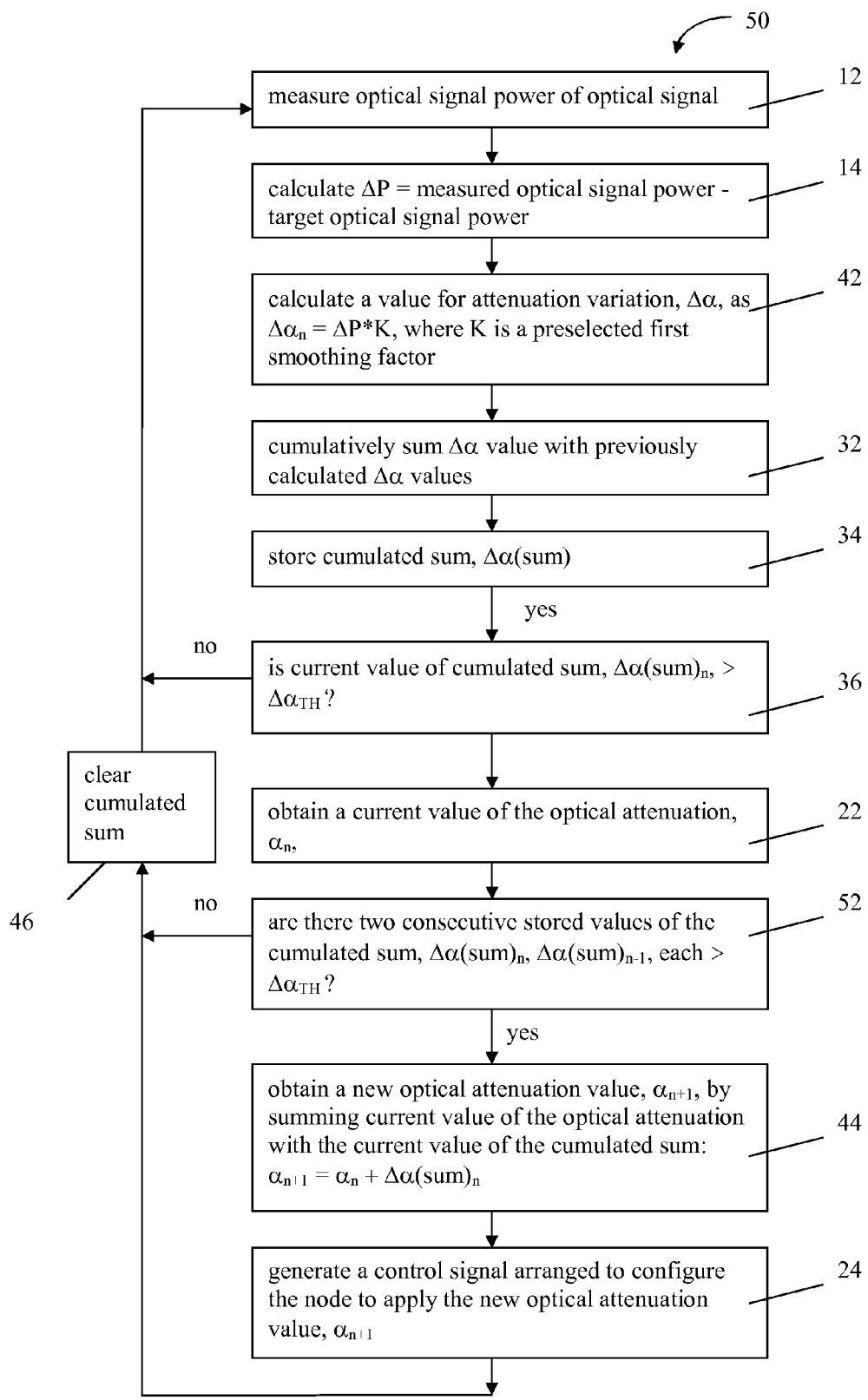
FIG. 4 shows the steps of a method according to a fourth embodiment of the invention of controlling optical signal power levelling in an optical communication network node configured to apply an optical attenuation to an optical signal.

Referring to FIG. 4 a fourth embodiment of the invention provides a method 50 of controlling optical signal power levelling in an optical communication network node. The node is configured to apply an optical attenuation, α, to a pass-through optical signal.

The method 50 of this embodiment is similar to the method 40 of FIG. 3, with the following modifications. The same reference numbers are retained for corresponding steps.

In this embodiment, in step b., the new optical attenuation value, $\alpha_{n+1}$, is obtained 52 if there are two consecutive stored values of the cumulated sum, $\Delta\alpha(\text{sum})_n$, $\Delta\alpha(\text{sum})_{n-1}$, which are each greater than the threshold value, $\Delta\alpha_{TH}$. If there are not two consecutive stored values of the cumulated sum which are greater than the threshold value, the method comprises clearing the cumulated sum 46 and recommencing at step a.

Figure 5:
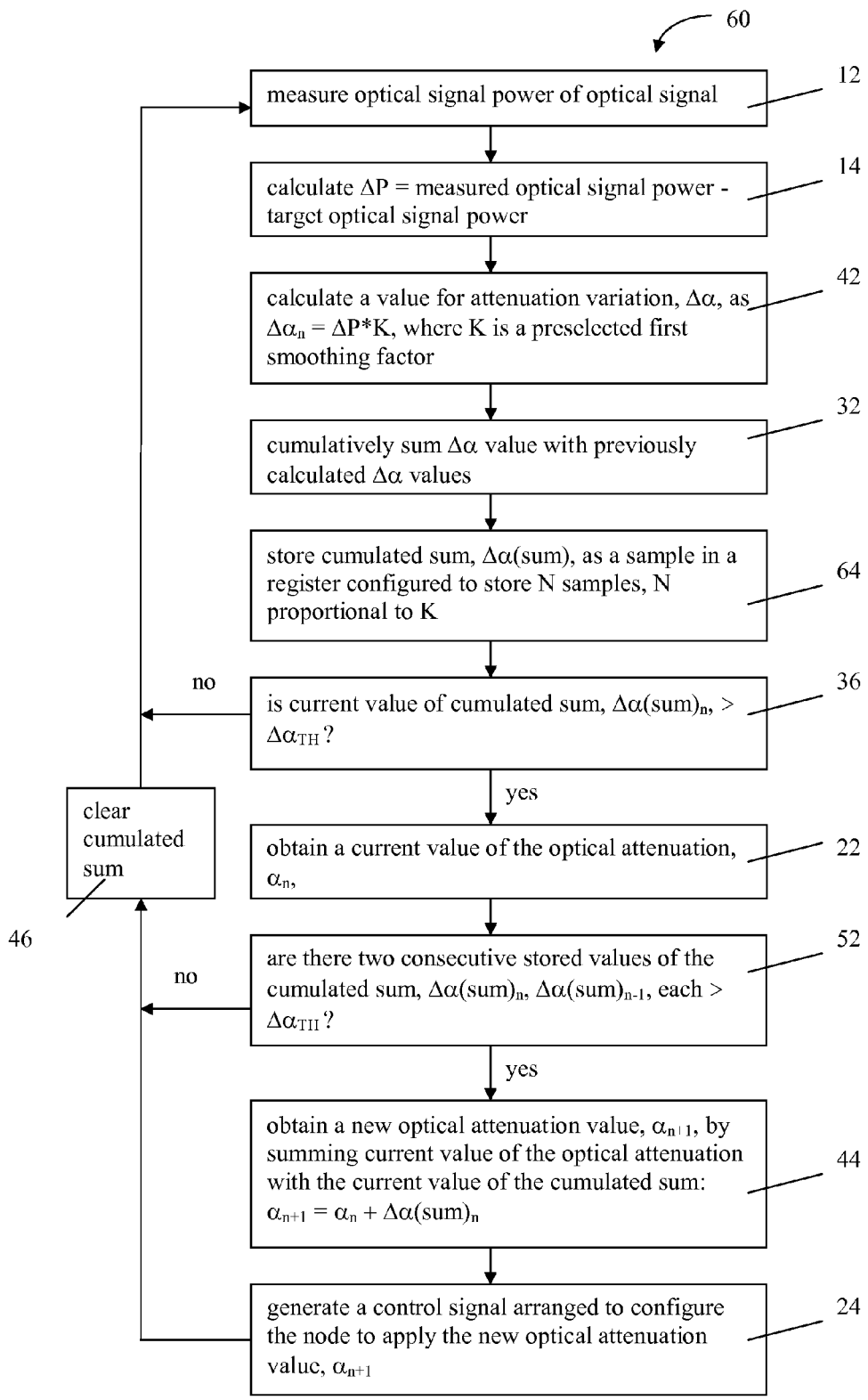
FIG. 5 shows the steps of a method according to a fifth embodiment of the invention of controlling optical signal power levelling in an optical communication network node configured to apply an optical attenuation to an optical signal.

Referring to FIG. 5 a fifth embodiment of the invention provides a method 60 of controlling optical signal power levelling in an optical communication network node. The node is configured to apply an optical attenuation, α, to a pass-through optical signal.

The method 60 of this embodiment is similar to the method 50 of FIG. 4, with the following modifications. The same reference numbers are retained for corresponding steps.

The method further comprises storing each value of the cumulated sum, $\Delta\alpha(\text{sum})_n$, as a sample in a register configured to store N samples 64. N is proportional to the inverse of the first smoothing factor, K. N is the number of values of the cumulated sum that need to be stored in the register to enable the method 60 is able to check that there are two consecutive stored values of the cumulated sum which are greater than the threshold value. Storing each value of the cumulated sum, $\Delta\alpha(\text{sum})_n$, as a sample in a register configured to store N samples, where N is proportional to 1/K, enables the method to check that there are two consecutive stored cumulated sum values which are each greater than the threshold value, $\Delta\alpha_{TH}$, by simply checking whether two of the values stored as samples in the register are greater than the threshold value.

Figure 6:
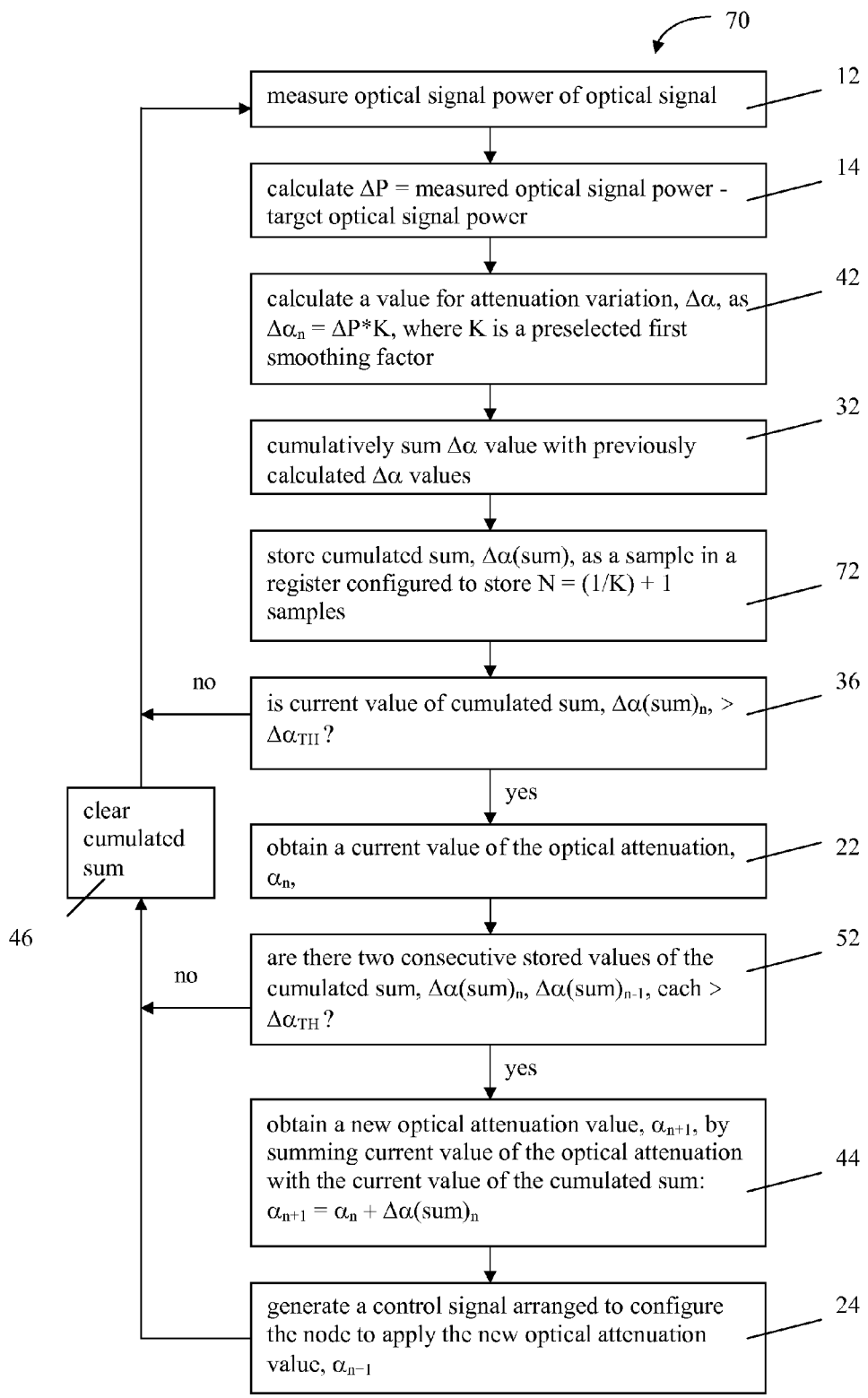
FIG. 6 shows the steps of a method according to a sixth embodiment of the invention of controlling optical signal power levelling in an optical communication network node configured to apply an optical attenuation to an optical signal.

Referring to FIG. 6, a sixth embodiment of the invention provides a method 70 of controlling optical signal power levelling in an optical communication network node. The node is configured to apply an optical attenuation, α, to a pass-through optical signal.

The method 70 of this embodiment is similar to the method 60 of FIG. 5, with the following modifications. The same reference numbers are retained for corresponding steps.

The register is configured to store at least (1/K)+1 samples, N (1/K)+1, and in this embodiment the register is configured to store N=(1/K)+1 samples. By storing N samples the method is able to check whether there are two consecutive stored cumulated sum values which are each greater than the threshold value, $\Delta\alpha_{TH}$, by simply checking whether two of the values stored as samples in the register are greater than the threshold value.

Figure 7:
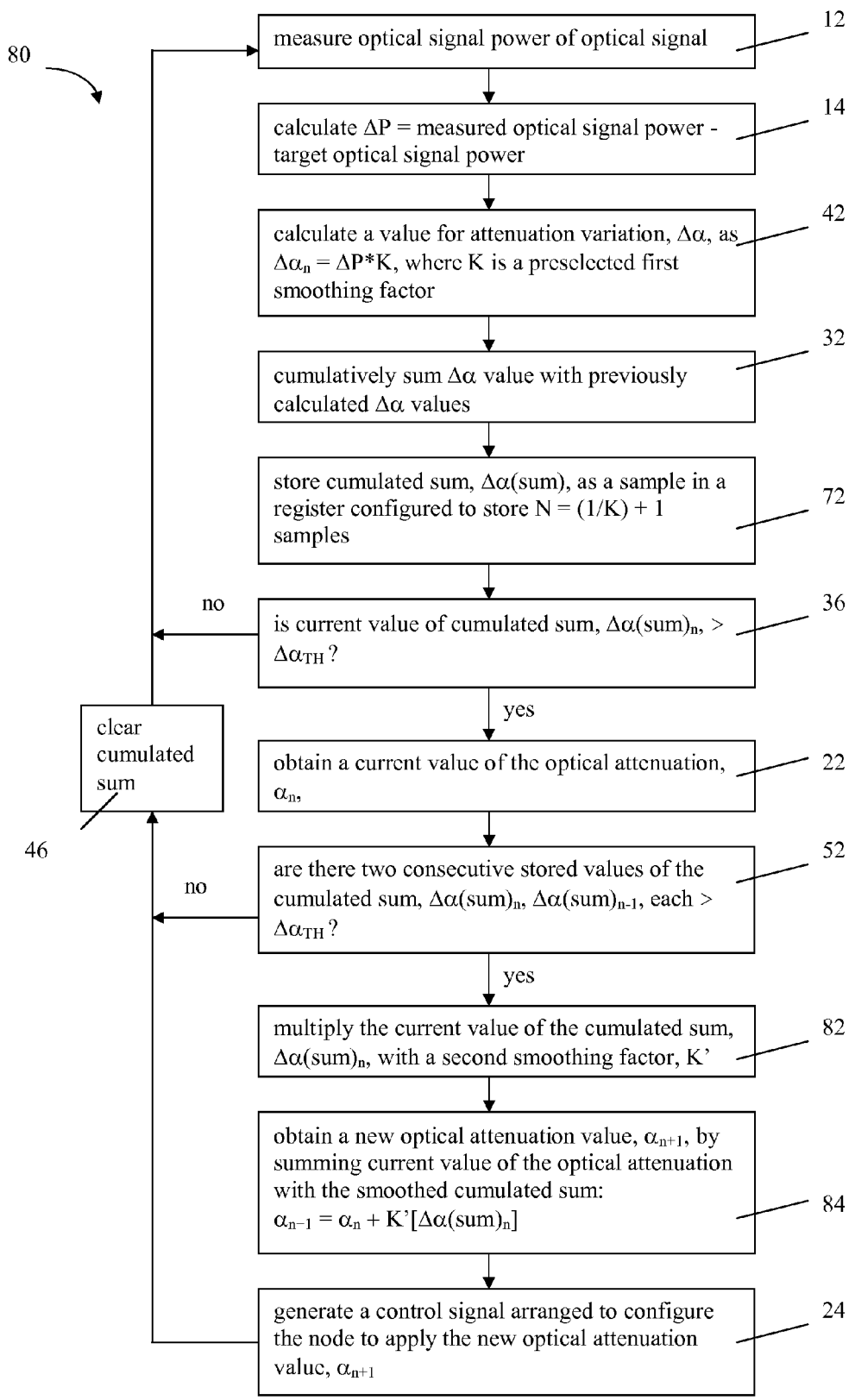
FIG. 7 shows the steps of a method according to a seventh embodiment of the invention of controlling optical signal power levelling in an optical communication network node configured to apply an optical attenuation to an optical signal.

Referring to FIG. 7, a seventh embodiment of the invention provides a method 80 of controlling optical signal power levelling in an optical communication network node. The node is configured to apply an optical attenuation, α, to a pass-through optical signal.

The method 80 of this embodiment is similar to the method 70 of FIG. 6, with the following modifications. The same reference numbers are retained for corresponding steps.

In this embodiment, in step b. the cumulated sum, $\Delta\alpha(\text{sum})_n$, is multiplied 82 with a second smoothing factor, K', before being summed 84 with the current value of the optical attenuation, $\alpha_n$, to obtain a new optical attenuation value, $\Delta\alpha_{n+1}$:

$$\alpha_{n+1}=\alpha_n+K'[\Delta\alpha(\text{sum})_n]$$

The second smoothing factor has a value of less than 1. K' may have a value in the range 0.05 to 0.5.

Optical signal power variations are not expected on pass-through optical signals, therefore if a ΔP is detected the method initially assumes that the ΔP is noise and discards the first value of the cumulated sum which is greater than the threshold value. If there is a second occurrence of the cumulated sum being greater than the threshold value then the method assumes that the ΔP is not noise but rather is an optical signal power different which needs to be corrected. There is however still a possibility that the ΔP is noise, and applying the attenuation variation may therefore result in oscillations being created. Applying the second smoothing factor, K', to the current value of the cumulated sum, $\Delta\alpha(\text{sum})_n$, before summing it with the current value of the attenuation means that only part of the power difference, ΔP, is corrected, in case it is noise. The second smoothing factor therefore slows the correction of an optical signal power difference, ΔP, between the detected optical signal power and the target optical signal power, which prevents the occurrence of optical signal power oscillations on the optical signal.

Figure 8:
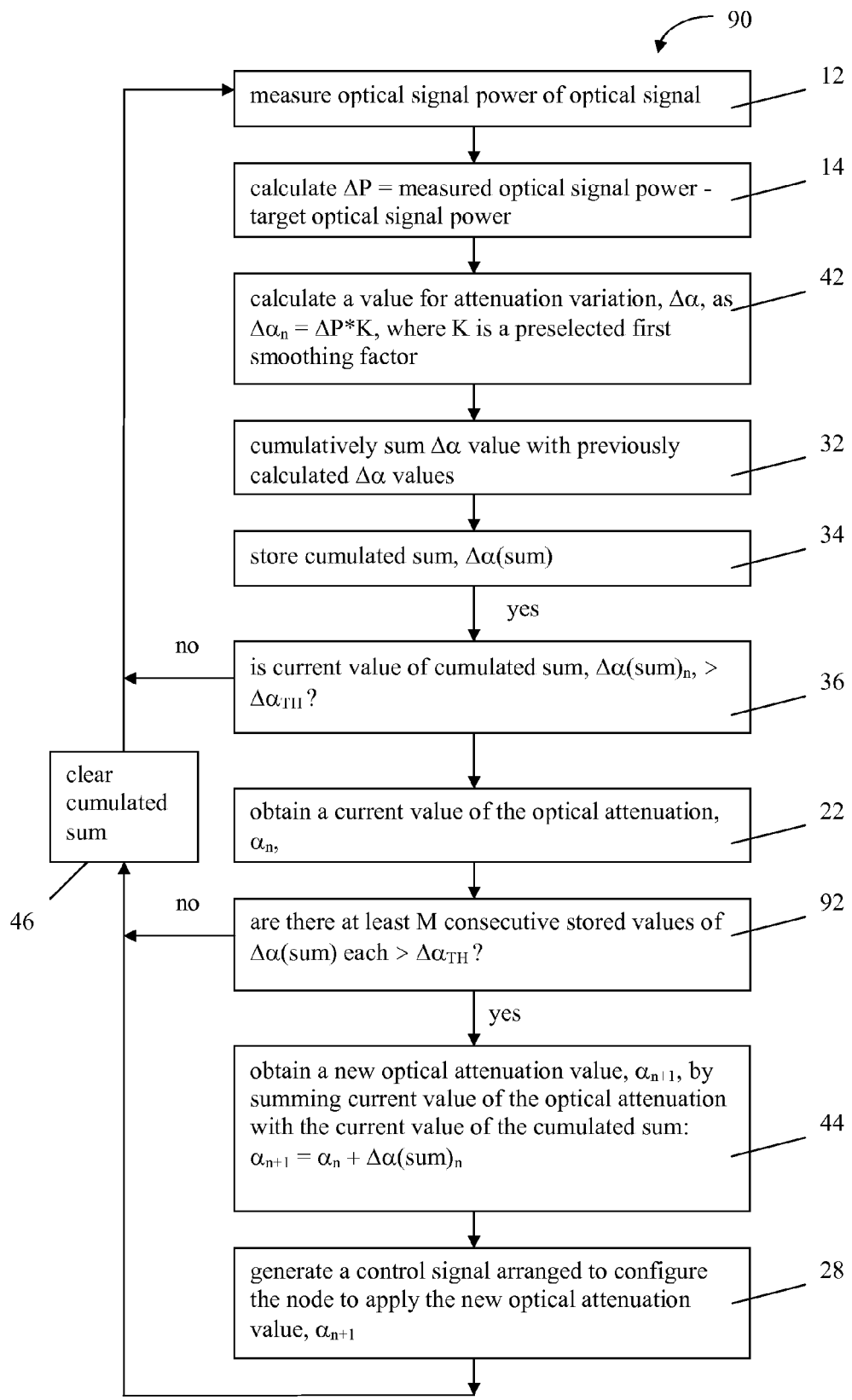
FIG. 8 shows the steps of a method according to an eighth embodiment of the invention of controlling optical signal power levelling in an optical communication network node configured to apply an optical attenuation to an optical signal.

Referring to FIG. 8, an eighth embodiment of the invention provides a method 90 of controlling optical signal power levelling in an optical communication network node. The node is configured to apply an optical attenuation, α, to a pass-through optical signal.

The method 90 of this embodiment is similar to the method 70 of FIG. 6, with the following modifications. The same reference numbers are retained for corresponding steps.

In this embodiment, the new optical attenuation value, $\alpha_{n+1}$, is obtained if 92 there are at least M consecutive stored values of the cumulated sum, $\Delta\alpha(\text{sum})$, which are each greater than the threshold value, $\Delta\alpha_{TH}$. M is a positive integer calculated as a function of a number of optical communication network nodes configured to apply an optical attenuation to a pass-through optical signal which precede the said optical communication network node in a path of the optical signal.

In a ninth embodiment of the invention, having the same steps as shown in FIG. 8, M is a positive integer calculated as a monotonically increasing function of the said number of optical communication network nodes configured to apply an optical attenuation to a pass-through optical signal which precede the said optical communication network node. M may, for example, be one of the following: the said number of preceding nodes; the said number of preceding nodes multiplied by a constant, M=c*N; or the square root of the said number of preceding nodes.

A tenth embodiment of the invention provides a method of controlling optical signal power levelling in an optical communication network node. The node is configured to apply an optical attenuation, α, to a pass-through optical signal. The method of this embodiment is similar to the method 10 of FIG. 1, with the following modifications.

In this embodiment, the optical communication network node is further configured to apply a further optical attenuation, α(add), to add optical signals.

The method further comprises, if the optical signal is an add optical signal, performing the following steps d. and e. in place of steps b. and c.:

d. obtaining a current value of the further optical attenuation, $\alpha(add)_n$, and summing said value, $\alpha(add)_n$, with the current attenuation variation value, $\Delta\alpha_n$, to form a new further optical attenuation value, $\alpha(add)_{n+1}$; and e. generating a control signal arranged to configure the node to apply the new further optical attenuation value, $\alpha(add)_{n+1}$.

Figure 9:
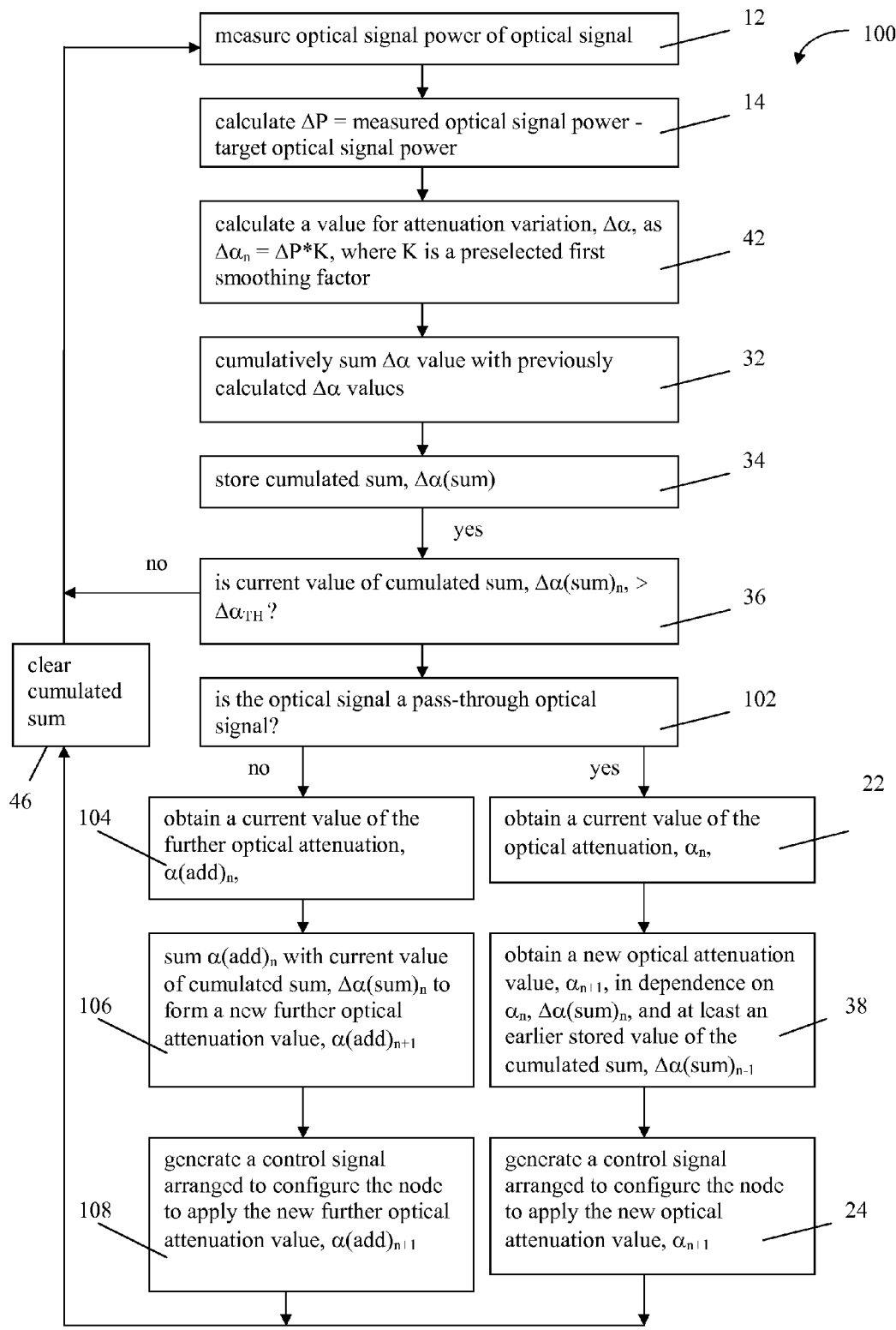
FIG. 9 shows the steps of a method according to an eleventh embodiment of the invention of controlling optical signal power levelling in an optical communication network node configured to apply an optical attenuation to an optical signal.

Referring to FIG. 9, an eleventh embodiment of the invention provides a method 100 of controlling optical signal power levelling in an optical communication network node. The node is configured to apply an optical attenuation, α, to a pass-through optical signal.

The method 100 of this embodiment is similar to the method 30 of FIG. 2, with the following modifications. The same reference numbers are retained for corresponding steps.

In this embodiment, the optical communication network node is further configured to apply a further optical attenuation, α(add), to add optical signals.

The method further comprises, if the optical signal is an add optical signal 102 performing the following steps d. and e. in place of steps b. and c.:

d. obtaining 104 a current value of the further optical attenuation, $\alpha(add)_n$, and summing 106 said value, $\alpha(add)_n$, with the cumulated sum, $\Delta\alpha(sum)_n$, to form a new further optical attenuation value, $\alpha(add)_{n+1}$; and e. generating 108 a control signal arranged to configure the node to apply the new further optical attenuation value, $\alpha(add)_{n+1}$.

As in FIG. 3, the value for the attenuation variation, Δα, is calculated 42 as $\Delta\alpha n=\Delta P*K$, where K is a preselected first smoothing factor.

It will be appreciated that the steps of this embodiment may be added to any of the preceding embodiments, in order that the methods described in those embodiments may handle both pass-through and add optical signals.

Figure 10:
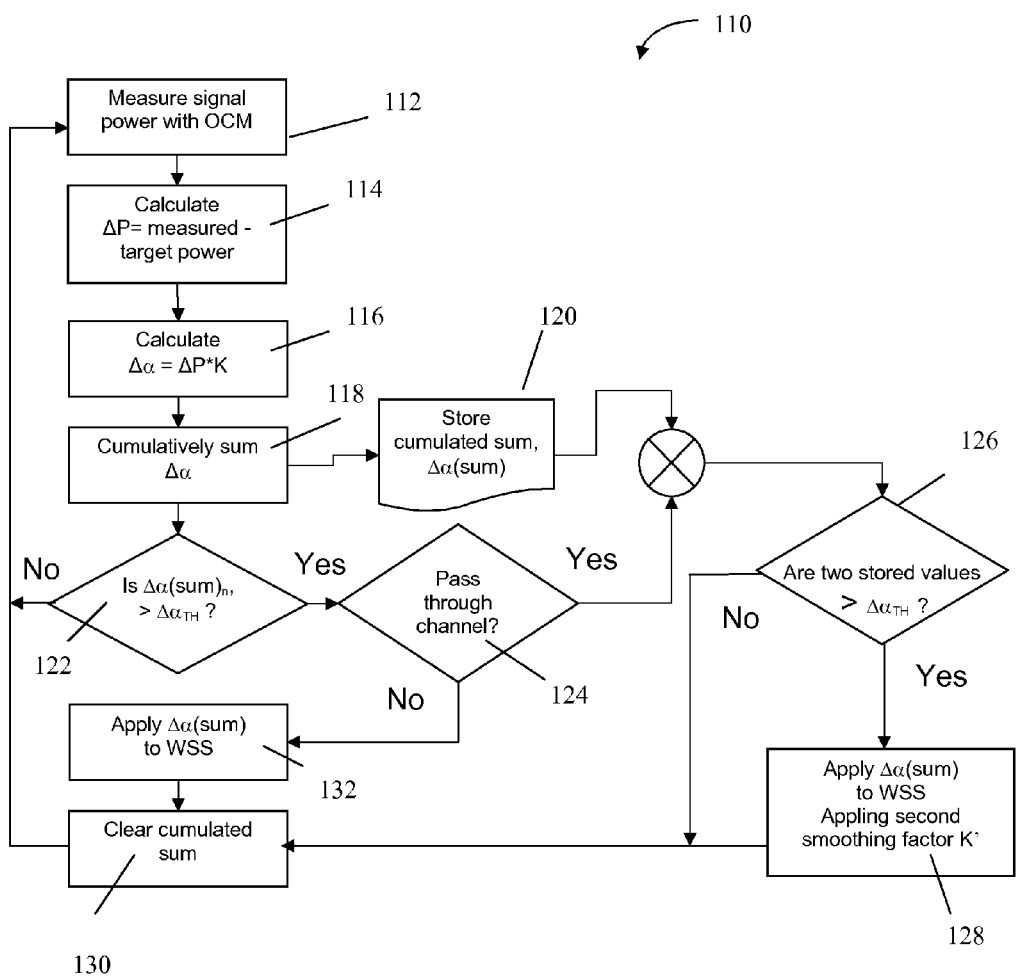
FIG. 10 shows the steps of a method according to a twelfth embodiment of the invention of controlling optical signal power levelling in an optical communication network node configured to apply an optical attenuation to an optical signal.

FIG. 10 shows the steps of a method 110 according to a twelfth embodiment of the invention of controlling optical signal power levelling in an optical communication network node. The node is configured to apply an optical attenuation, α, to an optical signal, which may be pass-through or add.

The node comprises an optical channel monitor, OCM, and a wavelength selective switch, WSS. The WSS is arranged to apply the optical attenuation, α, to the optical signal. The OCM is arranged to measure an optical signal power of an optical signal.

The method 110 comprises step a. of performing the following steps i. to iii. and cumulatively summing 118 each calculated value of an attenuation variation, $\Delta\alpha_n$, until the cumulated sum, $\Delta\alpha(sum)_n$, is greater than a preselected attenuation variation threshold value 122, $\Delta\alpha_{TH}$:

i. measuring an optical signal power of an optical signal 112 using the OCM;

ii. calculating a difference, ΔP, between the measured optical signal power and a target optical signal power 114;

iii. calculating 116 a value for the attenuation variation, $\Delta\alpha_n$, to be applied to the optical attenuation, applying a first smoothing factor, K, as $\Delta\alpha_n=\Delta P*K$.

The attenuation variation threshold value, $\Delta\alpha_{TH}$, is the dead-zone threshold setting of the WSS, being the threshold below which no attenuation variation is applied to the WSS.

The current value of the cumulated sum, $\Delta\alpha(sum)_n$, is stored 120 in a register arranged to store the last N values of $\Delta\alpha(sum)_n$.

The method 110 comprises a step 124 of checking whether the optical signal which has been measured is a pass-through optical signal. If the optical signal is not a pass-through optical signal, i.e. it is an add signal, then the current cumulated sum value, $\Delta\alpha(sum)_n$, is applied to the WSS 132, as follows. A current value of the WSS optical attenuation is obtained, $\alpha(add)_n$, and summed with the current cumulated sum value, $\Delta\alpha(sum)_n$, to form a new optical attenuation value, $\alpha(add)_{n+1}$. A control signal arranged to configure the WSS to apply the new optical attenuation value, $\alpha(add)_{+1}$. The cumulated sum value, $\Delta\alpha(sum)_n$, is then cleared 130, so that the method can restart.

If the optical signal is a pass-through optical signal, the method proceeds by considering the last N cumulated sum values stored in the register 126, to check whether there are two stored values which are greater than the attenuation variation threshold. If the current value is the only value of the cumulated sum in the register which is greater than the attenuation variation threshold, then it is the first time that the cumulated sum, Δα(sum), has exceeded than the attenuation variation threshold and it will be disregarded. The method then clears the cumulated attenuation 130, to allow steps i. to iii. to be repeated. If instead there are two stored cumulated sum values in the register which are greater than the attenuation variation threshold, this means that last cumulated sum value is not the first to exceed the attenuation variation threshold value. The method then proceeds to apply the current cumulated sum value, $\Delta\alpha(sum)_n$, to the WSS 128, as follows. The current value of the optical attenuation, $\alpha_n$, of the WSS is obtained and a new optical attenuation value, $\alpha_{n+1}$, is obtained by summing it with the current cumulated sum value, $\Delta\alpha(sum)_n$. A control signal arranged to configure the WSS to apply the new optical attenuation value, $\alpha_{n+1}$, is then generated.

The number of samples in the register, N, sets the time, expressed in loop cycles, over which the method checks whether there are two stored cumulated sum values, Δα(sum), which are greater than attenuation variation threshold, $\Delta\alpha_{TH}$. This time period is proportional to 1/K to enable the node to compensate for an optical signal power different, ΔP, effectively related to that node, and to keep the level of accuracy determined by the attenuation variation threshold, being the dead zone threshold setting of the WSS. The number of register samples, N, is given as: $N\geq(1/K)+1$. This enables the method to check whether there are two consecutive stored cumulated sum values which are each greater than the threshold value, $\Delta\alpha_{TH}$, by simply checking whether two of the N stored samples are greater than the threshold value.

The method may also multiply the current cumulated sum value, $\Delta\alpha(sum)_n$, with a second smoothing factor, K', before summing it with the current value of the optical attenuation, $\alpha_n$. This may enable better optical signal power oscillation suppression.

The second smoothing factor further reduces the occurrence of optical signal power oscillations. If the ΔP that is detected is in fact noise then trying to correct for this ΔP may make the noise worse, which may lead to oscillations. Noise on the optical signal power reading in the node may result in more than two stored values of the cumulated sum being greater than the attenuation variation threshold, $\Delta\alpha_{TH}$, leading to the attenuation variation being incorrectly applied. By applying the second smoothing factor the attenuation variation which is applied is reduced, therefore the correction to the $\Delta P$ that is applied is reduced, so if $\Delta P$ is noise the applied correction will not result in optical signal power oscillations. The second smoothing factor, K', is in effect slowing down the response speed of the node compared to the speed at which the optical signal power of a pass-through channel may be changed by a network operator, but this is not an issue since the optical signal power control to respond to a fast event, like a line failure, which causes a variation in the aggregated input power of a WDM optical signal is managed with transient management of amplifiers and/or other control loops to maintain the correct power level for the aggregate WDM signal, which may comprise up to 96 optical signals/channels.

Figure 11:
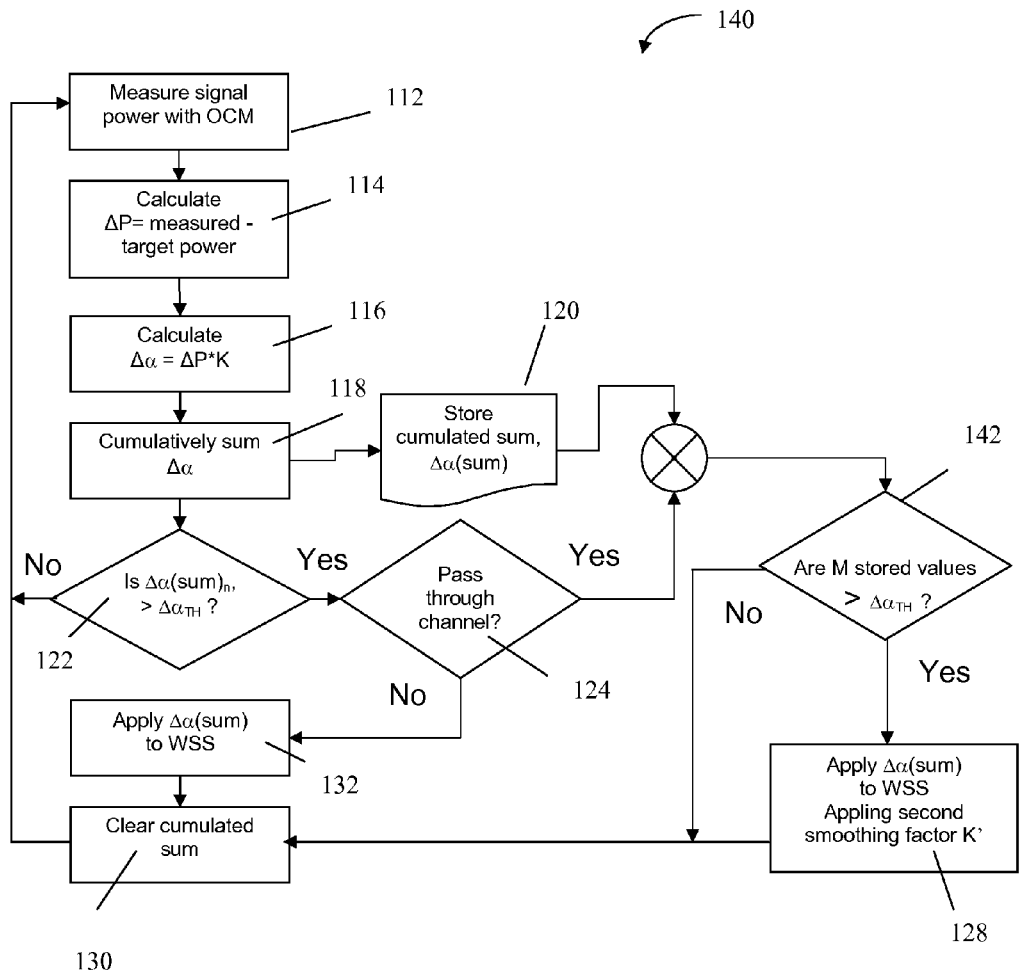
FIG. 11 shows the steps of a method according to a thirteenth embodiment of the invention of controlling optical signal power levelling in an optical communication network node configured to apply an optical attenuation to an optical signal.

FIG. 11 shows the steps of a method 140 according to a thirteenth embodiment of the invention of controlling optical signal power levelling in an optical communication network node. The method 140 is similar to the method 110 of FIG. 10, with the following modifications. The same reference numbers are retained for corresponding steps.

In this embodiment, the method checks whether there are M stored cumulated sum values which are each greater than the threshold value, $\Delta\alpha_{TH}$, by checking whether M of the N stored samples are greater than the threshold value.

Simulations of the method were performed for an optical signal propagating in an optical communication network path comprising 20 nodes, the nodes comprising ROADMs. The optical signal is added at the first node and then propagates as a pass-through optical signal through node 2 to 20. A random error of 0.3 dB (+/−0.15) was added to the simulated optical signal power reading at each node to simulate random optical noise in the optical signal.

Figure 12:
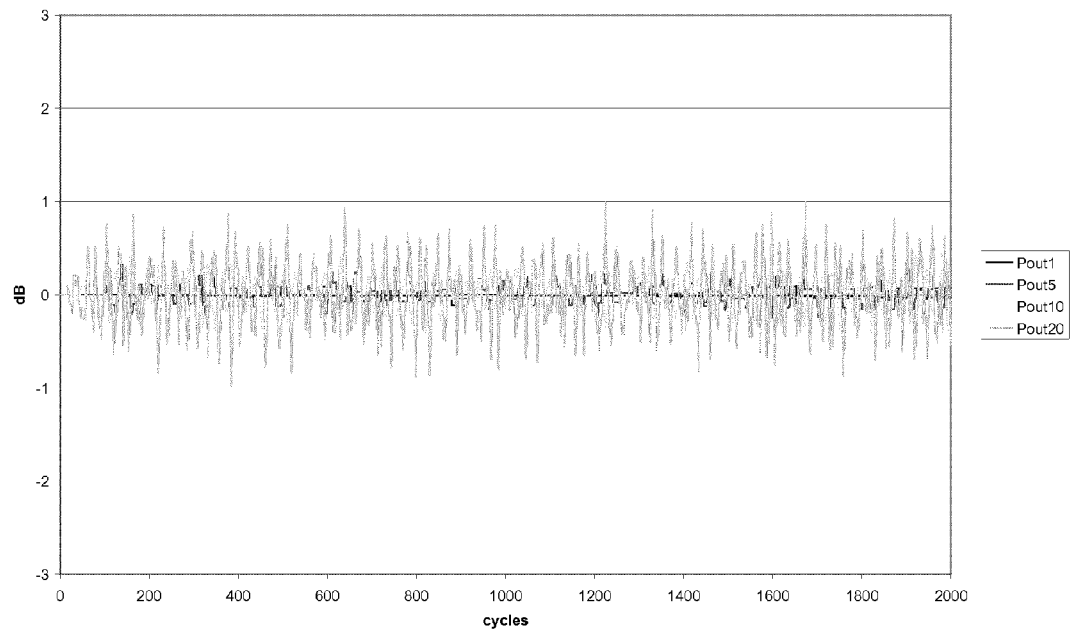
FIG. 12 shows simulated optical signal power readings at the 1$^{st}$, 5$^{th}$, 10$^{th}$ and 20$^{th}$ nodes of an optical communication network path comprising 20 nodes as a function of cycles of the method of FIG. 10, excluding steps 120, 124, 126, 128 (step 122 proceeds directly to step 132), where K=0.1, $\Delta\alpha_{TH}$=0.2 dB.

FIG. 12 shows the simulated optical signal power readings at the $1^{st}$, $5^{th}$, $10^{th}$ and $20^{th}$ nodes as a function of cycles of steps 112 to 118, 122, 132 and 130 of the method of FIG. 10. It will be appreciated that in this scenario step 122 proceeds directly to step 132. These steps comprise a prior art method of optical signal power levelling applied by ROADMs to both pass-through and add/optical signals (channels), that is to say without differentiating between pass-through and add signals. In this simulation K=0.1, and $\Delta\alpha_{TH}$=0.2 dB. The simulations show that, the optical signal power oscillations are above 1 dB after 10 nodes and above 2 dB after node 20.

Figure 13:
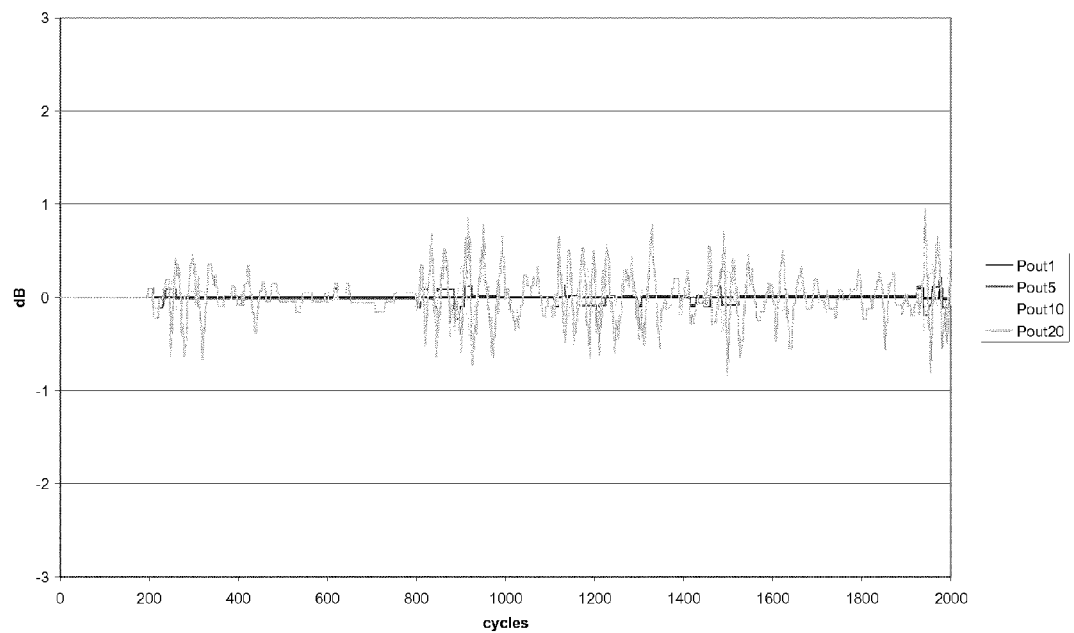
FIG. 13 shows simulated optical signal power readings at the 1$^{st}$, 5$^{th}$, 10$^{th}$ and 20$^{th}$ nodes of an optical communication network path comprising 20 nodes as a function of cycles of the method of FIG. 10, where N=11, K=0.1, $\Delta\alpha_{TH}$=0.2 dB, and no second smoothing factor is applied (K'=0)

FIG. 13 shows the simulated optical signal power readings at the $1^{st}$, $5^{th}$, $10^{th}$ and $20^{th}$ nodes of the same path as used for the simulations of FIG. 12. In this simulation the method shown in FIG. 10 is implemented. That is to say, pass-through and add optical signals are treated differently. Only steps 112 to 118, 122, 132 and 130 are applied at the $1^{st}$ node, since the optical signal is an add signal at this node. All of the steps of FIG. 10 are relevant for the $2^{nd}$ to $20^{th}$ nodes.

In this simulation, K=0.1, N=(1/K+1)=11, and $\Delta\alpha_{TH}$=0.2 dB. No second smoothing factor was applied for this simulation (K'=0). It can be seen that the optical signal power oscillations are noticeably reduced as compared to those shown in FIG. 12. The oscillations are very small also after 5 nodes, but after 10 nodes the sum of the optical signal power variations caused by the optical attenuation variations applied by each of the 10 nodes may be enough to trigger oscillations. The optical signal power oscillations are above 1 dB after 10 nodes and reach about 2 dB at node 20.

Figure 14:
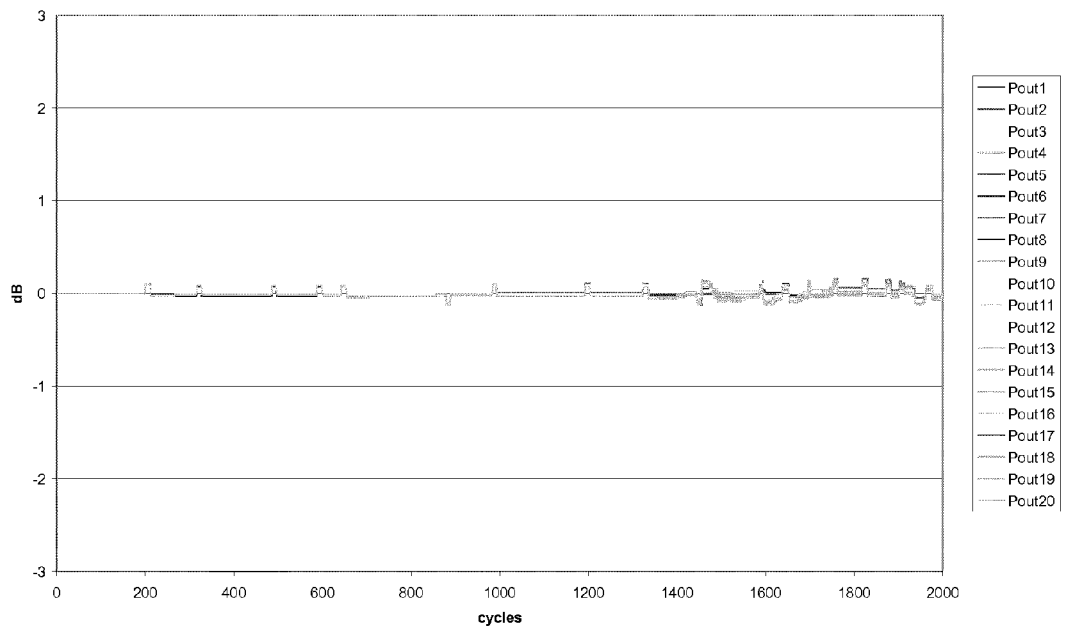
FIG. 14 shows simulated optical signal power readings each of the 20 nodes of an optical communication network path as a function of cycles of the method of FIG. 10, where N=11, K=0.1, $\Delta\alpha_{TH}$=0.2 dB, and K'=0.2.

FIG. 14 shows the simulated optical signal power readings at each of the 20 nodes of the same path as used for the simulations of FIGS. 12 and 13, as a function of cycles of the method of FIG. 10. As for FIG. 12, N=11, K=0.1, $\Delta\alpha_{TH}$=0.2 dB. In this embodiment a second smoothing factor, K', is also applied, 128 in FIG. 10. K'=0.2. As can be seen, applying the second smoothing factor produces a significant further reduction in optical signal power oscillations in the simulated optical signal power readings at each of the nodes. The oscillations are no longer amplified as they are propagated along the path; only the optical signal power variation caused by the optical attenuation variation applied at the first node is significant, and is generally maintained by the following nodes, which each add only very small optical signal power variation contributions. This is because the second smoothing factor K' reduces the optical signal power difference, $\Delta P$, that is able to trigger the oscillations shown in FIG. 13 The optical signal power oscillations are below 0.5 dB (0.35 dB for this specific simulation) after 20 nodes, and the net contribution of the 19 nodes after the first is below 0.2 dB.

Figure 15:
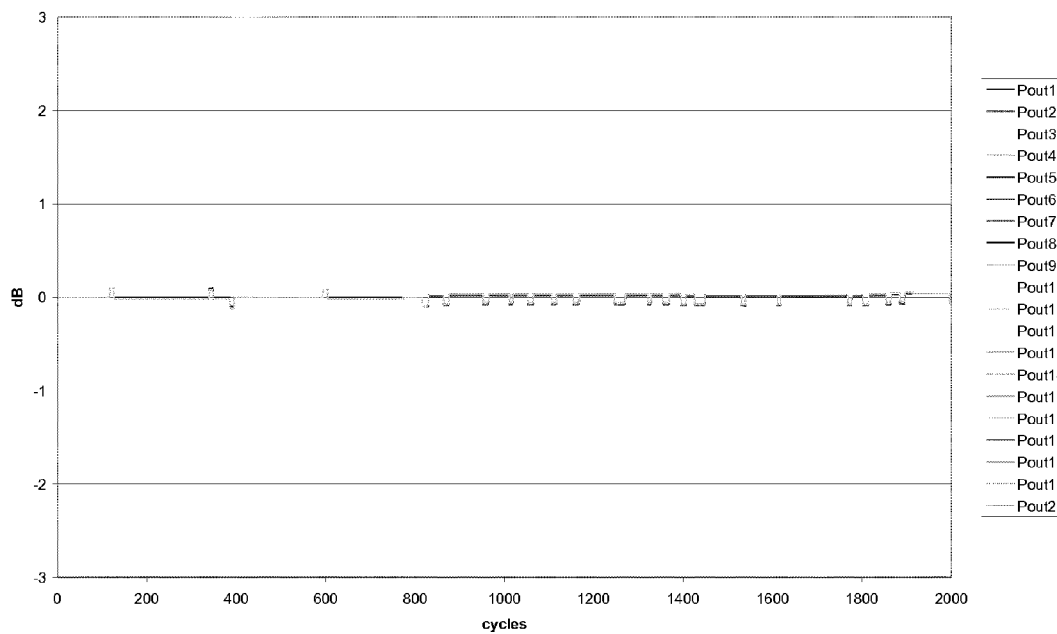
FIG. 15 shows simulated optical signal powers each of the 20 nodes of an optical communication network path as a function of cycles of the method of FIG. 10, where N=(10*M)+1, K=0.1, $\Delta\alpha_{TH}$=0.2 dB, K'=0.2, and M=sqrt (no. nodes)

FIG. 15 shows the simulated optical signal power readings at each of the 20 nodes of the same path as used for the simulations of FIGS. 12 to 14, as a function of cycles of the method of FIG. 11. As for FIG. 14, K=0.1, $\Delta\alpha_{TH}$=0.2 dB, and K'=0.2. In this simulation the number of samples, N, in the register is calculated as N=(10*M)+1, where M=sqrt (preceding no. nodes) and therefore changes for each node along the path. The value of M is truncated to an integer. As can be seen, compared to FIGS. 13 to 14, there is no change for nodes 2 and 3, since we have the same settings: M=1 and N=11. For nodes 4 to 8 M=2 and N=21, and so on. In this simulation there is no further, or negligible, contribution from all the nodes of the path, as indicated by the fact that the simulated optical signal powers shown for nodes 3 to 20 are almost overlapped.

Figure 16:
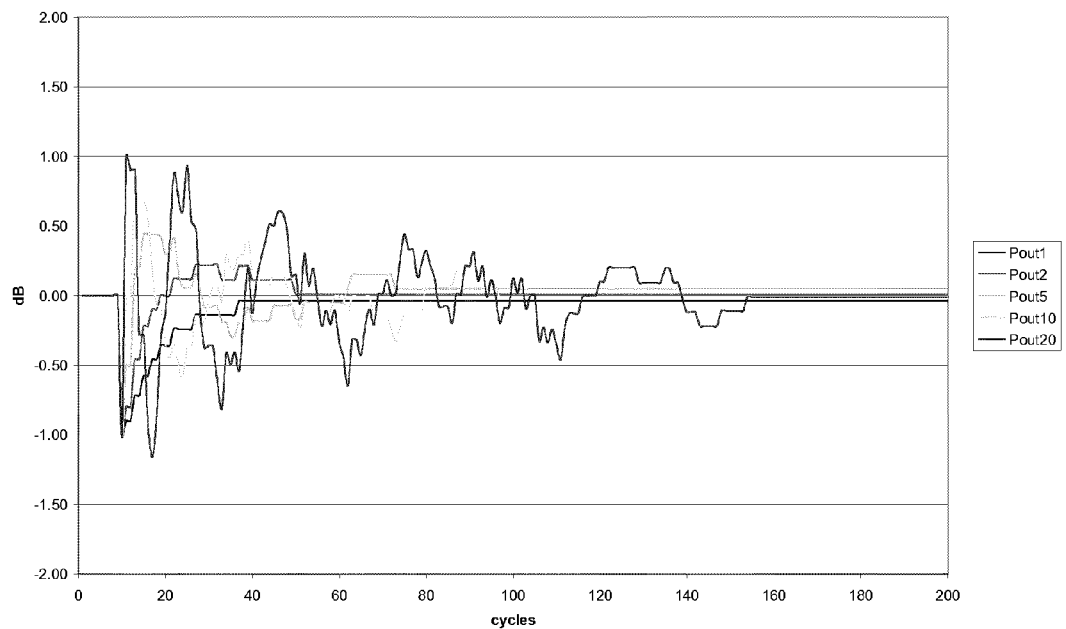
FIG. 16 shows simulated optical signal power readings at the 1$^{st}$, 5$^{th}$, 10$^{th}$ and 20$^{th}$ nodes of an optical communication network path comprising 20 nodes in response to a $\Delta$P of 1 dB at the 1$^{st}$ node of the path, applying the method of FIG. 10 excluding steps 120, 124, 126, 128 (step 122 proceeds directly to step 132), where K=0.1, $\Delta\alpha_{TH}$=0.2 dB.
Figure 17:
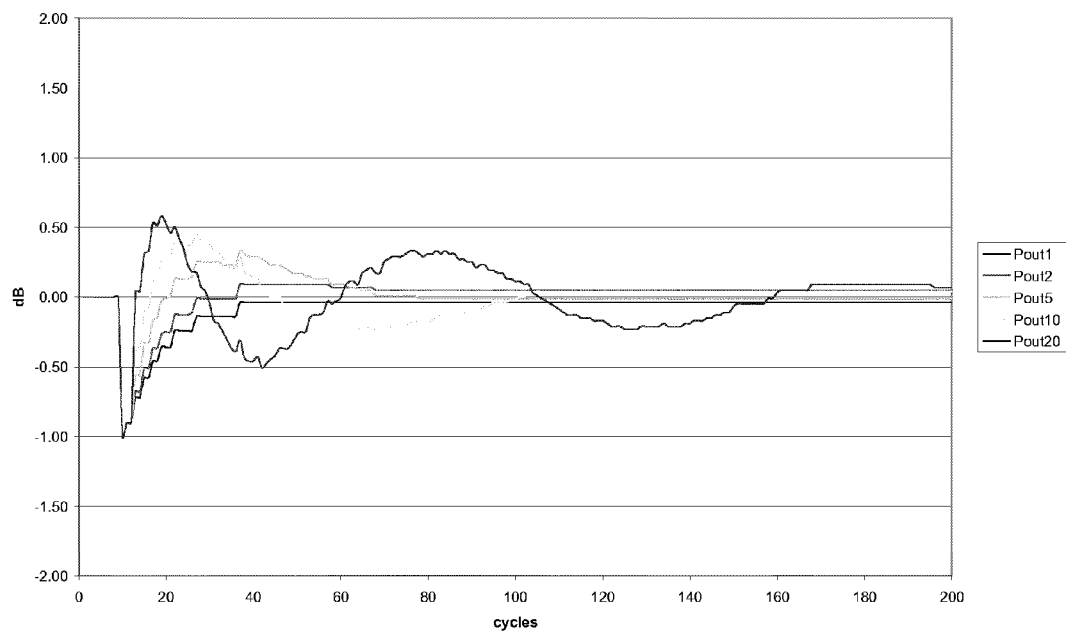
FIG. 17 shows simulated optical signal power readings at the 1$^{st}$, 5$^{th}$, 10$^{th}$ and 20$^{th}$ nodes of an optical communication network path comprising 20 nodes in response to a $\Delta$P of 1 dB at the 1$^{st}$ node of the path, applying the method of FIG. 10, where N is 11, K=0.1, $\Delta\alpha_{TH}$=0.2 dB, and K'=0.2.
Figure 18:
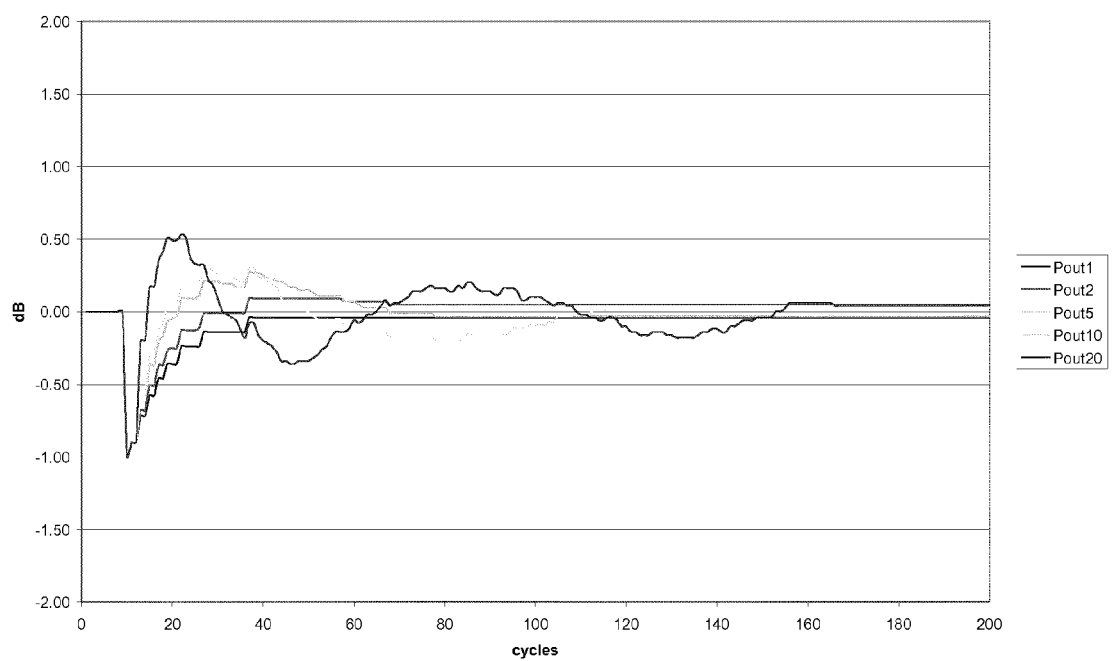
FIG. 18 shows simulated optical signal power readings at the 1$^{st}$, 5$^{th}$, 10$^{th}$ and 20$^{th}$ nodes of an optical communication network path comprising 20 nodes in response to a $\Delta$P of 1 dB at the 1$^{st}$ node of the path, applying the method of FIG. 10, where N=(10*M)+1, K=0.1, $\Delta\alpha_{TH}$=0.2 dB, K'=0.2, and M=sqrt (no. nodes)

The method of FIG. 11 does not prevent or slow down the capability of the nodes in the path to follow a real change of optical signal power introduced at the $1^{st}$ node, where the signal is added, which needs to be compensated for but actually also helps to achieve this. FIGS. 16 to 18 illustrate how the nodes of the same path as used for the simulations of FIGS. 12 to 15 react to an optical signal power variation which needs to be compensated for. The simulated optical signal power readings at nodes 1, 5, 10 and 20 are shown for an optical signal power difference, $\Delta P$=1 dB at the input of node 1. No random error has been used in these simulations so that the effect on compensating a real optical signal power variation of applying the method of FIG. 10 can be clearly seen.

FIG. 16 shows the simulated optical signal power readings at the $1^{st}$, $5^{th}$, $10^{th}$ and $20^{th}$ nodes of the same path as used for the simulations of FIGS. 12 to 15 in response to a $\Delta P$ of 1 dB at the $1^{st}$ node of the path. As for the simulation of FIG. 12, only steps 112 to 118, 122, 132 and 130 of the method of FIG. 10 are implemented. In this simulation K=0.1, and $\Delta\alpha_{TH}$=0.2 dB.

FIG. 17 shows the simulated optical signal power readings at the $1^{st}$, $5^{th}$, $10^{th}$ and $20^{th}$ nodes of the same path as used for the simulations of FIGS. 12 to 16 in response to a $\Delta P$ of 1 dB at the $1^{st}$ node of the path, applying the method of FIG. 10. Similarly to FIG. 13, only steps 112 to 118, 122, 132 and 130 are applied at the $1^{st}$ node, since the optical signal is an add signal at this node. All of the steps of FIG. 10 are relevant for the 2$^{nd}$ to 20$^{th}$ nodes. N is 11, K=0.1, $\Delta\alpha_{TH}$=0.2 dB, and K'=0.2.

FIG. 18 shows simulated optical signal power readings at the 1$^{st}$, 5$^{th}$, 10$^{th}$ and 20$^{th}$ nodes of the same path as used for the simulations of FIGS. 12 to 17 in response to a $\Delta P$ of 1 dB at the 1$^{st}$ node of the path, applying the method of FIG. 11, where N=(10*M)+1, K=0.1, $\Delta\alpha_{TH}$=0.2 dB, K'=0.2, and M=sqrt (no. nodes).

A fourteenth embodiment of the invention provides a method of controlling optical signal power levelling in an optical communication network path. The network path comprises a plurality of optical communication network nodes each configured to apply a respective optical attenuation, $\alpha$, to a pass-through optical signal propagating along the path.

The method comprises configuring each optical communication network node to perform the method of controlling optical signal power levelling as described in any of the previous embodiments.

Figure 19:
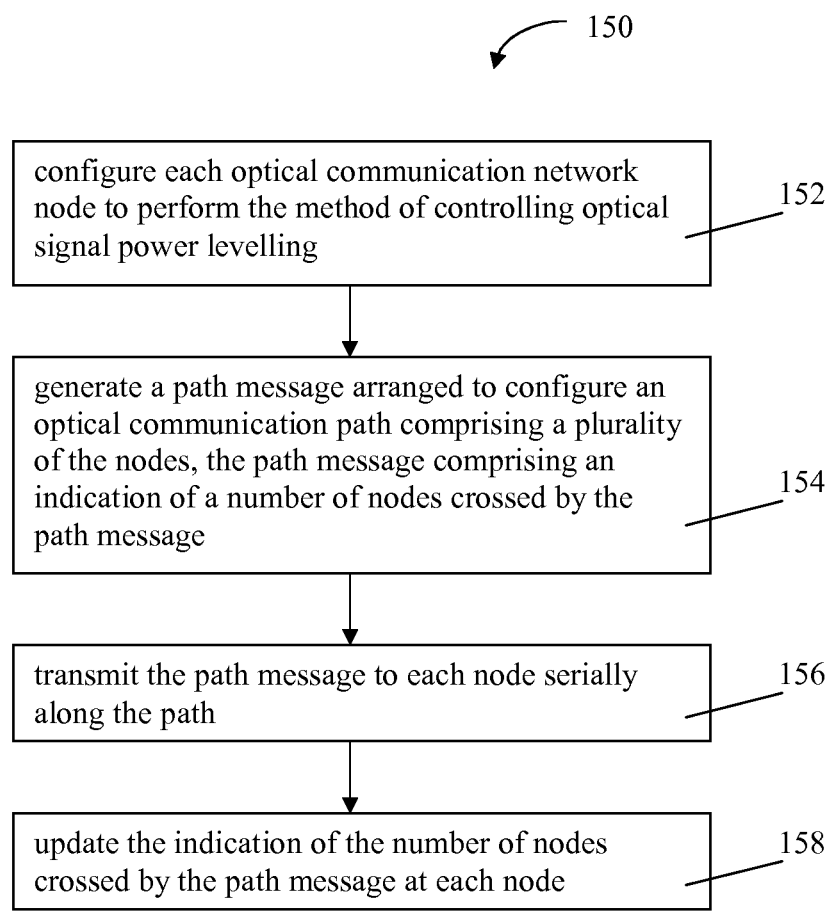
FIG. 19 shows the steps of a method according to a fifteenth embodiment of the invention of controlling optical signal power levelling in an optical communication network path.

The steps of a method 150 according to a fifteenth embodiment of the invention of controlling optical signal power levelling in an optical communication network path are shown in FIG. 19. The network path comprises a plurality of optical communication network nodes each configured to apply a respective optical attenuation, $\alpha$, to a pass-through optical signal propagating along the path.

The method comprises:
configuring each optical communication network node to perform the method of controlling optical signal power levelling as described in any of the previous embodiments 152;
generating a path message arranged to configure the path, the path message comprising an indication of a number of nodes crossed by the path message 154;
transmitting the path message to each node serially along the path 156; and
updating the indication of the number of nodes respectively at each node 158.

The path message is one of a strict explicit route object RSVP-TE protocol message and a loose explicit route object RSVP-TE protocol message.

The indication of the number of nodes crossed by the path message is one of a node count field arranged to store the number of nodes crossed by the path message and a node list comprising an identification of each node crossed by the path message.

Figure 20:
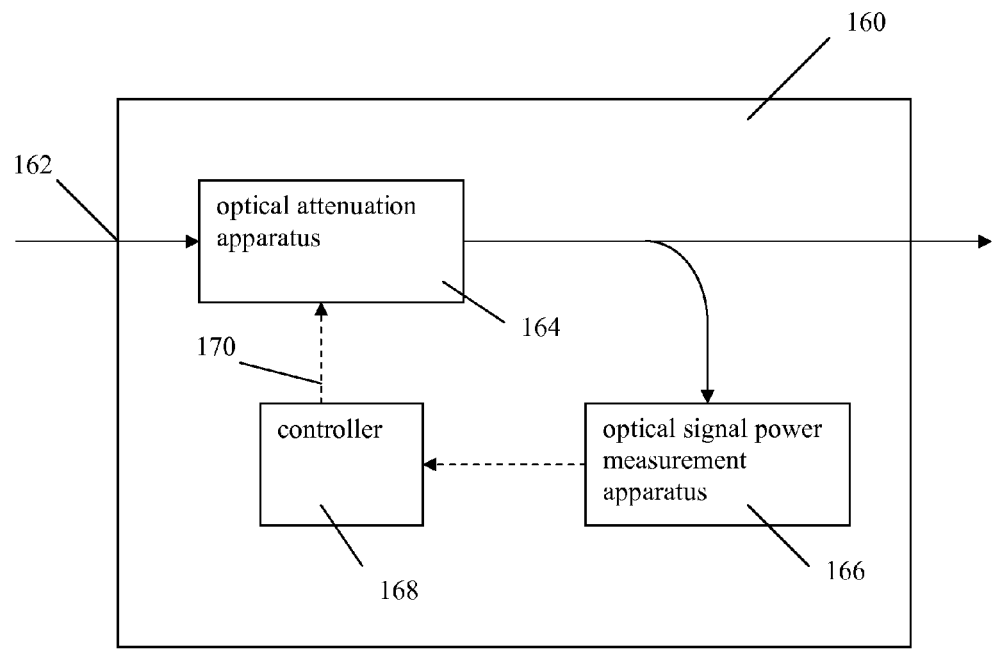
FIG. 20 is a schematic representation of an optical communication network node according to a sixteenth embodiment of the invention.

Referring to FIG. 20, a sixteenth embodiment of the invention provides an optical communication network node 160 comprising an input 162, optical attenuation apparatus 164, optical signal power measurement apparatus 166, and a controller 168.

The input 162 is arranged to receive an optical signal. The optical attenuation apparatus 164 is configured to apply an optical attenuation, $\alpha$, to the optical signal. The optical signal power measurement apparatus 166 is arranged to measure an optical signal power of the optical signal.

The controller 168 is arranged to:
a. perform the following steps i. to iii. until the an attenuation variation value, $\Delta\alpha$, is greater than a preselected attenuation variation threshold value, $\Delta\alpha_{TH}$:
  i. receive a measured optical signal power from the optical signal power measurement apparatus 166;
  ii. calculate a difference, $\Delta P$, between the measured optical signal power and a target optical signal power;
  iii. calculate a value for the attenuation variation, $\Delta\alpha_n$, to be applied to the optical attenuation taking account of $\Delta P$;
b. a new optical attenuation value, $\alpha_{n+1}$, in dependence on the current value of the optical attenuation, the current attenuation variation value, $\Delta\alpha_n$, and at least an earlier attenuation variation value $\Delta\alpha_{n-1}$; and
c. generate a control signal arranged 170 to configure the optical attenuation apparatus 164 to apply the new optical attenuation value, $\alpha_{n+1}$.

Figure 21:
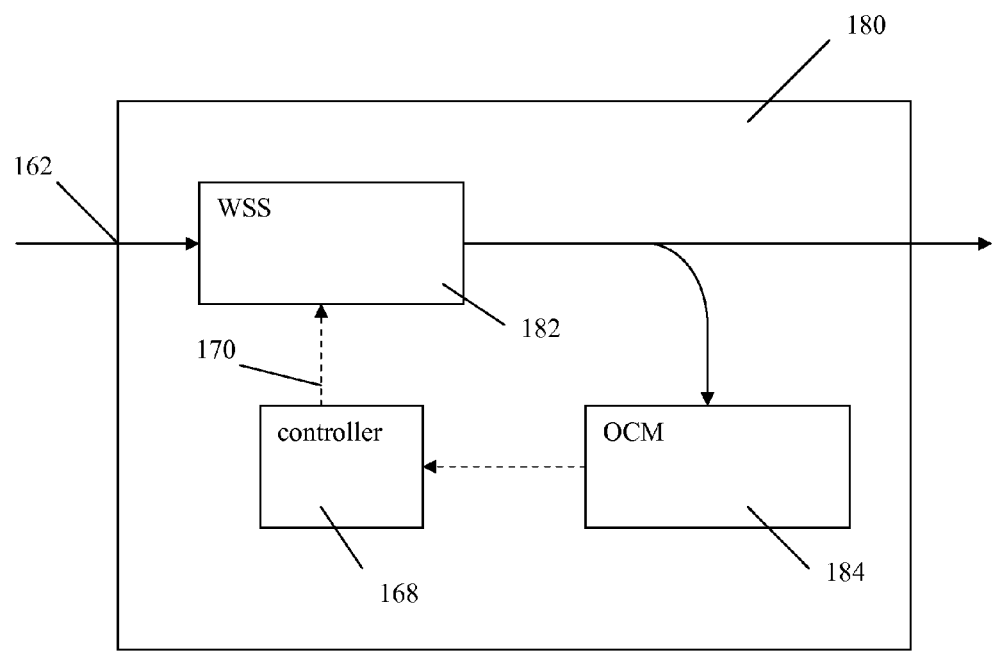
FIG. 21 is a schematic representation of an optical communication network node according to a seventeenth embodiment of the invention.

Referring to FIG. 21, a seventeenth embodiment of the invention provides an optical communication network node 180. The node 180 of this embodiment is similar to the node 160 of the previous embodiment, with the following modifications. The same reference numbers are retained for corresponding features.

In this embodiment, the optical attenuation apparatus is a wavelength selective switch, WSS, 182. The optical signal power measurement apparatus is an optical channel monitor, OCM, 184.

The controller 168 is arranged to receive a measured optical signal power from the OCM. The controller is arranged to generate a control signal 170 arranged to configure the WSS 182 to apply the new optical attenuation value, $\alpha_{n+1}$.

Figure 22:
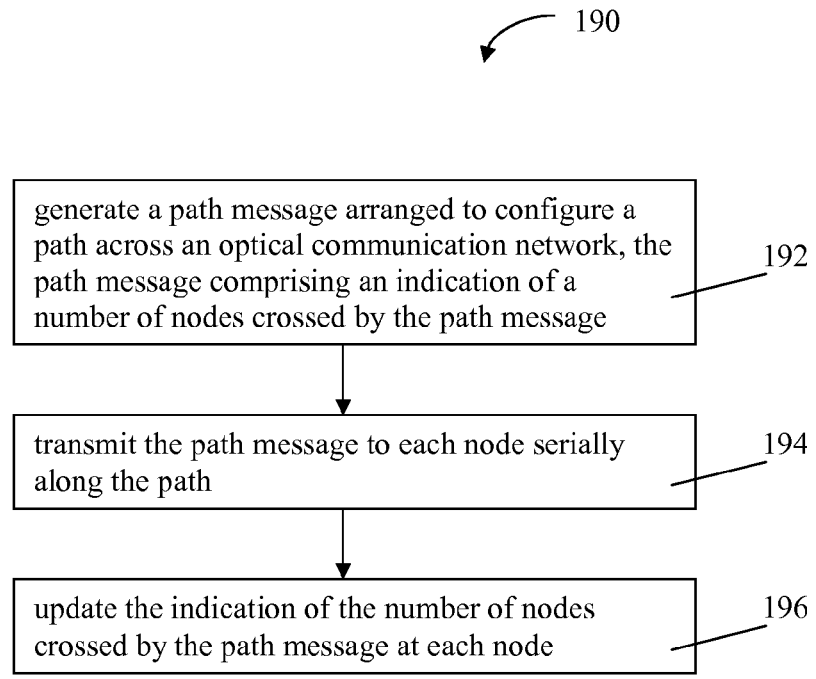
FIG. 22 shows the steps of a method according to an eighteenth embodiment of the invention of configuring a path across an optical communication network.

The steps of a method 190 according to an eighteenth embodiment of the invention of configuring a path across an optical communication network are shown in FIG. 22.

The method comprises:
generating a path message arranged to configure the path 192, the path message comprising an indication of a number of nodes crossed by the path message;
transmitting the path message to each node serially along the path 194; and
at each node, updating the indication of the number of nodes crossed by the path message 196.

Figure 23:
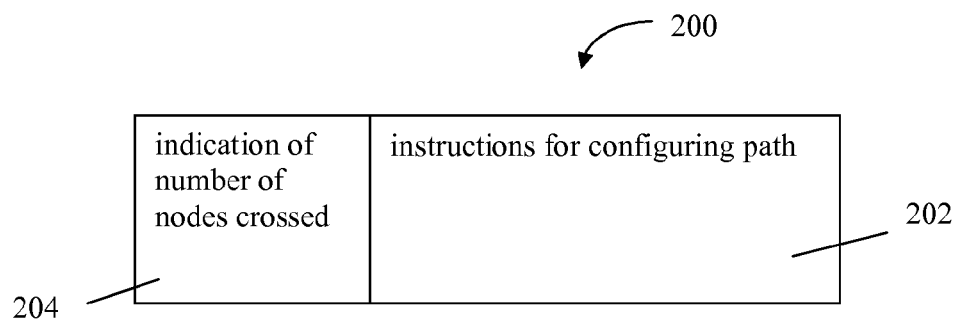
FIG. 23 is a schematic representation of an optical communication network path message according to a nineteenth embodiment of the invention.

Referring to FIG. 23, a nineteenth embodiment of the invention provides an optical communication network path message 200 comprising instructions 202 for configuring a path across an optical communication network and an indication of a number of nodes crossed by the path message 204.

A twentieth embodiment of the invention provides a data carrier having computer readable instructions embodied therein. The computer readable instructions are for providing access to resources available on a processor and comprise instructions to cause the processor to perform any of the steps of the method of controlling optical signal power levelling in an optical communication network node configured to apply an optical attenuation to an optical signal as described in any of the above embodiments.

The data carrier may be a non-transient data carrier.

A twenty-first embodiment of the invention provides a data carrier having computer readable instructions embodied therein. The computer readable instructions are for providing access to resources available on a processor and comprise instructions to cause the processor to perform any of the steps of the method of controlling optical signal power levelling in an optical communication network path as described in the thirteenth or fourteenth embodiments.

A twenty-second embodiment of the invention provides a data carrier having computer readable instructions embodied therein. The computer readable instructions are for providing access to resources available on a processor and comprise instructions to cause the processor to perform any of the steps of the method of configuring a path across an optical communication network according to the seventeenth embodiment.

The invention claimed is:

1. A method of controlling optical signal power levelling in an optical communication network node configured to apply an optical attenuation, $\alpha$, to a pass-through optical signal, the method comprising:
   a. performing the following steps i. to iii. until an attenuation variation value, $\Delta\alpha$, is greater than a preselected attenuation variation threshold value, $\Delta\alpha_{TH}$:
      i. measuring an optical signal power of an optical signal;
      ii. calculating a difference, $\Delta P$, between the measured optical signal power and a target optical signal power;
      iii. calculating a value for the attenuation variation, $\Delta\alpha$, to be applied to the optical attenuation taking account of $\Delta P$;
   b. obtaining a current value of the optical attenuation, $\alpha_n$, and obtaining a new optical attenuation value, $\alpha_{n+1}$, in dependence on the current value of the optical attenuation, a current value of the attenuation variation, $\Delta\alpha_n$, and at least an earlier value of the attenuation variation, $\Delta\alpha_{n-1}$; and
   c. generating a control signal arranged to configure the node to apply the new optical attenuation value, $\alpha_{n+1}$.

2. A method as claimed in claim 1, wherein step a. comprises performing steps i. to iii. and cumulatively summing each calculated value of the attenuation variation, $\Delta\alpha_n$, until a current value of the cumulated sum, $\Delta\alpha(sum)_n$, is greater than the preselected attenuation variation threshold value, $\Delta\alpha_{TH}$, and storing each value of the cumulated sum, and in step b. the new optical attenuation value, $\alpha_{n+1}$, is obtained in dependence on the current value of the cumulated sum, $\Delta\alpha(sum)_n$, and at least an earlier stored value of the cumulated sum, $\Delta\alpha(sum)_{n-1}$.

3. A method as claimed in claim 2, wherein in step b., the new optical attenuation value, $\alpha_{n+1}$, is obtained if there is at least one earlier stored value of the cumulated sum, $\Delta\alpha(sum)_{n-1}$, which is greater than the threshold value, $\Delta\alpha_{TH}$, the new optical attenuation value, $\alpha_{n+1}$, being obtained by summing the current value of the optical attenuation, $\alpha_n$, with the current value of the cumulated sum, $\Delta\alpha(sum)_n$, and if there is not at least one earlier stored value of the cumulated sum which is greater than the threshold value, the method comprises clearing the cumulated sum and recommencing at step a.

4. A method as claimed in claim 3, wherein in step b., the new optical attenuation value, $\alpha_{n+1}$, is obtained if there are two consecutive stored values of the cumulated sum, $\Delta\alpha(sum)_n$, $\Delta\alpha(sum)_{n-1}$, which are each greater than the threshold value, $\Delta\alpha_{TH}$, and if there are not two consecutive stored values of the cumulated sum which are greater than the threshold value, the method comprises clearing the cumulated sum and recommencing at step a.

5. A method as claimed in claim 2, wherein in step a.iii, the value for the attenuation variation, $\Delta\alpha_n$, is calculated as $\Delta\alpha_n = \Delta P * K$, where K is a preselected first smoothing factor, and wherein each value of the cumulated sum, $\Delta\alpha(sum)_n$, is stored as a sample in a register configured to store N samples, where N is proportional to the inverse of the first smoothing factor, K.

6. A method as claimed in claim 5, wherein N is at least $(1/K)+1$.

7. A method as claimed in claim 5, wherein in step b. the method comprises multiplying the current value of the cumulated sum, $\Delta\alpha(sum)_n$, with a second smoothing factor, having a value of less than 1, before summing with the current value of the optical attenuation, $\alpha_n$.

8. A method as claimed in claim 5, the new optical attenuation value, $\alpha_{n+1}$, is obtained if there are at least M consecutive stored values of the cumulated sum, $\Delta\alpha(sum)$, which are each greater than the threshold value, $\Delta\alpha_{TH}$, where M is a positive integer calculated as a function of a number of optical communication network nodes configured to apply an optical attenuation to a pass-through optical signal which precede the said optical communication network node in a path of the optical signal.

9. A method as claimed in claim 8, wherein M is a positive integer calculated as a monotonically increasing function of said number of optical communication network nodes.

10. A method as claimed in claim 8, wherein N is $(1/K)*M+1$.

11. A method as claimed in claim 1, wherein the optical communication network node is further configured to apply a further optical attenuation, $\alpha(add)$, to an add optical signal and the method further comprises, if the optical signal is an add optical signal, performing the following steps d. and e. in place of steps b. and c.:
   d. obtaining a current value of the further optical attenuation, $\alpha(add)_n$, and summing said value, $\alpha(add)_n$, with the current attenuation variation value, $\Delta\alpha_n$, to form a new further optical attenuation value, $\alpha(add)_{n+1}$; and
   e. generating a control signal arranged to configure the node to apply the new further optical attenuation value, $\alpha(add)_{n+1}$.

12. A method of controlling optical signal power levelling in an optical communication network path comprising a plurality of optical communication network nodes each configured to apply a respective optical attenuation, $\alpha$, to a pass-through optical signal propagating along the path, the method comprising configuring each optical communication network node to perform the method of controlling optical signal power levelling as claimed in claim 1.

13. A method as claimed in claim 12, wherein the method comprises:
   generating a path message arranged to configure the path and transmitting the path message to each node serially along the path, the path message comprising an indication of a number of nodes crossed by the path message and the indication of the number of nodes being respectively updated at each node.

14. A method as claimed in claim 13, wherein the path message is one of a strict explicit route object RSVP-TE protocol message and a loose explicit route object RSVP-TE protocol message.

15. A method as claimed in claim 13, wherein the indication of a number of nodes crossed by the path message is one of a node count field arranged to store the number of nodes crossed by the path message and a node list comprising an identification of each node crossed by the path message.

16. A non-transient computer readable medium having computer readable instructions embodied therein, the computer readable instructions being for providing access to resources available on a processor and the computer readable instructions comprising instructions to cause the processor to perform the steps of claim 1.

17. A non-transient computer readable medium having computer readable instructions embodied therein, the computer readable instructions being for providing access to resources available on a processor and the computer readable instructions comprising instructions to cause the processor to perform the steps of claim 12.

18. An optical communication network node comprising:

an input arranged to receive an optical signal;

optical attenuation apparatus configured to apply an optical attenuation, $\alpha$, to the optical signal;

optical signal power measurement apparatus arranged to measure an optical signal power of the optical signal; and a controller arranged to:
- a. perform the following steps i. to iii. until an attenuation variation value, $\Delta\alpha$, is greater than a preselected attenuation variation threshold value, $\Delta\alpha_{TH}$:
  - i. receive a measured optical signal power from the optical signal power measurement apparatus;
  - ii. calculate a difference, $\Delta P$, between the measured optical signal power and a target optical signal power;
  - iii. calculate a value for the attenuation variation, $\Delta\alpha$, to be applied to the optical attenuation taking account of $\Delta P$;
- b. obtain a new optical attenuation value, $\alpha_{n+1}$, in dependence on the current value of the optical attenuation, the current attenuation variation value, $\Delta\alpha_n$, and at least an earlier attenuation variation value $\Delta\alpha_{n-1}$; and
- c. generate a control signal arranged to configure the optical attenuation apparatus to apply the new optical attenuation value, $\alpha_{n+1}$.

19. The optical communication network node of claim 18, wherein the optical attenuation apparatus comprises a wavelength selective switch.

20. The optical communication network node of claim 18, wherein the optical signal power measurement apparatus comprises an optical channel monitor.

* * * * *